(12) United States Patent  
Ranjan et al.

(10) Patent No.: US 8,930,966 B2  
(45) Date of Patent: Jan. 6, 2015

(54) SEARCHING SOCIAL CONNECTIONS OF A USER

(71) Applicant: LinkedIn Corporation, Mountain View, CA (US)

(72) Inventors: Nisheeth Ranjan, Palo Alto, CA (US); Michael Leeds, San Francisco, CA (US)

(73) Assignee: LinkedIn Corporation, Mountain View, CA (US)

(*) Notice: Subject to any disclaimer, the term of this patent is extended or adjusted under 35 U.S.C. 154(b) by 0 days.

(21) Appl. No.: 14/072,974

(22) Filed: Nov. 6, 2013

(65) Prior Publication Data

US 2014/0095620 A1  Apr. 3, 2014

Related U.S. Application Data

(63) Continuation of application No. 13/633,819, filed on Oct. 2, 2012.

(51) Int. Cl.
| | |
|---|---|
| *G06F 3/00* | (2006.01) |
| *G06Q 99/00* | (2006.01) |
| *H04L 29/08* | (2006.01) |
| *G06F 17/30* | (2006.01) |

(52) U.S. Cl.
CPC ........ *H04L 67/306* (2013.01); *G06F 17/30345* (2013.01)
USPC ............................ 719/318; 719/313; 705/319

(58) Field of Classification Search
CPC ................... G06F 17/30864; G06F 15/17306; G06F 17/30867; G06F 17/30991; G06F 17/30; G06F 17/30038; G06F 17/30241; G06F 17/30699; G06F 17/30722; G06F 17/30761; G06F 19/3443; G06F 19/3456; G06F 19/3481
See application file for complete search history.

(56) References Cited

U.S. PATENT DOCUMENTS

| 8,543,928 B2 | 9/2013 | Stovicek et al. |
| 2008/0115149 A1* | 5/2008 | Rupp et al. .................... 719/318 |
| 2008/0140786 A1* | 6/2008 | Tran .............................. 709/206 |
| 2010/0280904 A1 | 11/2010 | Ahuja |
| 2011/0137902 A1 | 6/2011 | Wable et al. |
| 2011/0173283 A1 | 7/2011 | Puthenkulam et al. |

(Continued)

OTHER PUBLICATIONS

U.S. Appl. No. 14/073,621, filed Nov. 6, 2013, Notice of Allowance.

(Continued)

*Primary Examiner* — Tuan Dao
(74) *Attorney, Agent, or Firm* — Hickman Palermo Truong Becker Bingham Wong LLP; Daniel D. Ledesma

(57) ABSTRACT

The present invention is directed to methods and systems for providing personal connection alerts. The user desires to have a personal connection with a target person. An indicator for a target is provided by the user. The indicator is often the name of the target, but can also be a picture of the target, or other information. A record for the target is created based on the received indicator. The target record is stored. A variety of additional information regarding the target may be obtained from external or internal sources and also stored in the target record. Then the target record is periodically compared with the user's social sphere of influence, which comprises the user's primary and secondary connections. The comparison includes at least comparing the target with the user's secondary connections. When the target record matches at least one of the user's secondary connections, an alert is provided.

22 Claims, 19 Drawing Sheets

(56) References Cited

U.S. PATENT DOCUMENTS

| | | |
|---|---|---|
| 2011/0191417 A1* | 8/2011 | Rathod .......................... 709/204 |
| 2011/0289011 A1* | 11/2011 | Hull et al. ..................... 705/319 |
| 2012/0150960 A1 | 6/2012 | Nalawade |
| 2012/0303714 A1 | 11/2012 | Chung et al. |
| 2013/0013550 A1* | 1/2013 | Kerby ............................. 706/52 |
| 2013/0024105 A1* | 1/2013 | Thomas ........................ 701/410 |
| 2013/0066967 A1 | 3/2013 | Alexander |

OTHER PUBLICATIONS

U.S. Appl. No. 13/633,819, filed Oct. 2, 2012, Office Action.

* cited by examiner

1000 

| PeopleQueue List(s) | | |
|---|---|---|
| User 1 | Record for Target 1 | Received input (e.g. name 1) |
| | Record for Target 2 | Received input (e.g. name 2) |
| | Record for Target 3 | Received input (e.g. title 3) |
| | Record for Target 4 | Received input (e.g. name 4) |
| | Record for Target 5 | Received input (e.g. image 5) |
| | ⋮ | |
| | Record for Target N | Received input (e.g. name N) |
| User 2 | Record for Target 6 | Received input (e.g. name 6) |
| | Record for Target 7 | Received input (e.g. name 7) |
| | Record for Target 8 | Received input (e.g. title 8) |
| | Record for Target 9 | Received input (e.g. skill 9) |
| | Record for Target 10 | Received input (e.g. name 10) |
| | ⋮ | |
| | Record for Target N | Received input (e.g. name N) |

⋮

| User N | Record for Target 11 | Received input (e.g. name 11) |
|---|---|---|
| | ⋮ | |
| | Record for Target N | Received input (e.g. name N) |

| IntroAlerts Record | |
|---|---|
| Alert ID (e.g. 1212) | 1202 |
| Target ID (e.g. 1234) | 1102 |
| Alert date (e.g. July 18, 2012) | 1204 |
| Alert time (e.g. 10:15 am) | 1206 |
| Notify Medium (e.g. email) | 1208 |
| Connection (e.g. Friend 1) | 1210 |
| Connection strength (e.g. 50%) | 1212 |
| Connection Strength Threshold (e.g. 80%) | 1122 |
| Additional Information (e.g. interests, organizations, skills) | 1112 |
| Feedback Information (e.g. introduction was made) | 1214 |
| ⋮ | |

| Social Sphere of Influence Database | | | | |
|---|---|---|---|---|
| User | Primary Connections | Connection Strength (U&F) | Secondary Connections | Connection Strength (F&P) |
| User 1 | Friend 1 | 80% | Person 1 | 40% |
| | | | Person 2 | 50% |
| | | | ⋮ | |
| | | | Person N | 10% |
| | Friend 2 | 72% | Person 3 | 25% |
| | | | Person 4 | 50% |
| | | | ⋮ | |
| | | | Person N | 80% |
| | Friend 3 | 33% | Person 5 | 25% |
| | | | Person 6 | 15% |
| | | | ⋮ | |
| | | | Person N | 95% |
| | ⋮ | | | |
| | Friend N | 10% | Person 7 | 90% |
| | | | Person 8 | 60% |
| | | | ⋮ | |
| | | | Person N | 100% |

Figure 13B

SEARCHING SOCIAL CONNECTIONS OF A USER

CROSS-REFERENCE TO RELATED APPLICATIONS; BENEFIT CLAIM

This application is a Continuation of U.S. patent application Ser. No. 13/633,819, filed Oct. 2, 2012, the entire contents of which is hereby incorporated by reference for all purposes as if fully set forth herein. The applicant(s) hereby rescind any disclaimer of claim scope in the parent application or the prosecution history thereof and advise the USPTO that the claims in this application may be broader than any claim in the parent application.

TECHNICAL FIELD

The disclosed embodiments relate generally to systems and methods for providing a personal connection alert to a user when a person that the user desires to meet or connect with, is now connected to the user, such as when the desired person is now friends with a friend of the user.

BACKGROUND

Salespeople spend time developing connections with leads, such as potential buyers of their product or service. Relationships with leads are difficult to cultivate when they begin as "cold calls," i.e., when the salesperson has no connection to the lead. However, when a lead is introduced to the salesperson through a shared connection, such as a common friend, the likelihood of closing a deal increases significantly. Similar benefits of connecting to a person through a shared connection exist in social, education, and governmental arenas as well.

Increasingly, users are utilizing electronic forms of communication and on-line social networks to communicate with and connect to friends, colleagues, business partners, potential employees, and sales prospects. These forms of communication and connection often include publicly and privately available databases which are accessible to software applications. For example, they may be available via public application programming interfaces (APIs).

However, with the explosive growth of such communication and networks people receive more and more unsolicited communication from people they do not know. As such, it is often difficult to connect with a target person without an introduction or a shared connection.

It would be advantageous to provide systems and methods for leveraging various databases such as public APIs to monitor a user's connections over various forms of electronic communication and social networking, combine the information, make computations and comparisons regarding the information, and notify the user about valuable new personal connections associated therewith.

SUMMARY

The present invention overcomes the limitations and disadvantages described above by providing methods, systems, and computer readable storage mediums for providing personal connection alerts.

In some embodiments, a system or service periodically searches a user's social sphere of influence to find people (such as the user's primary connections) that can introduce the user to a target person, i.e., a person that the user would like to meet.

In some embodiments, a system or service provides co-workers with a company level view of contacts, and provides an automatic discovery of relevant connections to targets, such as for example, business leads.

The following presents a summary of the invention in order to provide a basic understanding of some of the aspects of the invention. This summary is not an extensive overview of the invention. It is not intended to identify key/critical elements of the invention or to delineate the scope of the invention. Its sole purpose is to present some of the concepts of the invention in a simplified form as a prelude to the more detailed description that is presented later.

Some embodiments provide a computer-implemented method in which an indicator for a target associated with a user is received. A record for the target is created based on the received indicator. A target record is compared at least with secondary connections of the user. The comparison is performed periodically. Then when the target record matches at least one of the secondary connections of the user, an alert is provided.

Some embodiments also include a computer-implemented method in which a plurality of the user's contacts is obtained from an external source. Primary connections are created from the contacts. A primary connection includes a link, such as a social connection, between the user and a contact. For each primary connection, a plurality of the primary connection's contacts is obtained from an external source and a plurality of secondary connections is obtained. A secondary connection includes a link, such as a social connection, between the primary connection and a primary connection's contact. The plurality of primary connections is then combined with the plurality of secondary connections.

Another aspect of the invention involves a computer-implemented method in which one or more indicators for targets associated with a user are received. A PeopleQueue list with records for targets is created based on the received indicators. A target record of the PeopleQueue list is compared with records in the user's social sphere of influence. The comparison is performed periodically. Then when one or more alert conditions are met, an alert is provided. The alert conditions include at least a first match condition, where at least the respective target record of the PeopleQueue list matches at least one record in the user's social sphere of influence.

Another aspect of the invention involves a computer-implemented method in which one or more indicators for targets are received from a user. Information regarding one or more primary connections of the user are obtained and provided to a remote system. Then one or more secondary connections of the user are received from the remote system. A target record is compared with the primary and/or secondary connections of the user. The comparison is performed periodically. Then when the target record matches at least one of the secondary connections of the user an alert is provided.

Some embodiments provide an introduction alert system comprising one or more central processing units, CPU(s), for executing programs and also includes memory sorting the programs to be executed by the CPUs. The programs include instructions to perform any of the embodiments of the aforementioned methods.

Yet other embodiments provide a computer readable storage medium storing one or more programs configured for execution by a computer. The programs include instructions to perform any of the embodiments of the aforementioned methods.

These methods, systems, and GUIs described herein provide alerts to a user of personal connection(s) with a target, and in some embodiments provide additional information target or connections including connection strength metric(s) and mechanism(s) for connecting with the target.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

FIG. 10 illustrates an exemplary PeopleQueue list, according to some embodiments.

FIGS. 13A and 13B illustrate an exemplary social sphere of influence record and an exemplary listing of connections in a user's social sphere of influence database, respectively, according to some embodiments.

Like reference numerals refer to corresponding parts throughout the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present embodiments. However, it will be apparent to one of ordinary skill in the art that the present various embodiments may be practiced without these specific details. In other instances, well-known methods, procedures, components, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first element could be termed a second element, and, similarly, a second element could be termed a first element, without changing the meaning of the description, so long as all occurrences of the first element are renamed consistently and all occurrences of the second element are renamed consistently. The first element and the second element are both elements, but they are not the same element.

The terminology used in the description of the embodiments herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," as well as the terms "includes" and/or "including" when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to," depending on the context. Similarly, the phrase "if it is determined" or "if (a stated condition or event]) is detected" may be construed to mean "upon determining" or "in response to determining" or "upon detecting (the stated condition or event)" or "in response to detecting (the stated condition or event)," depending on the context.

Figure 1:
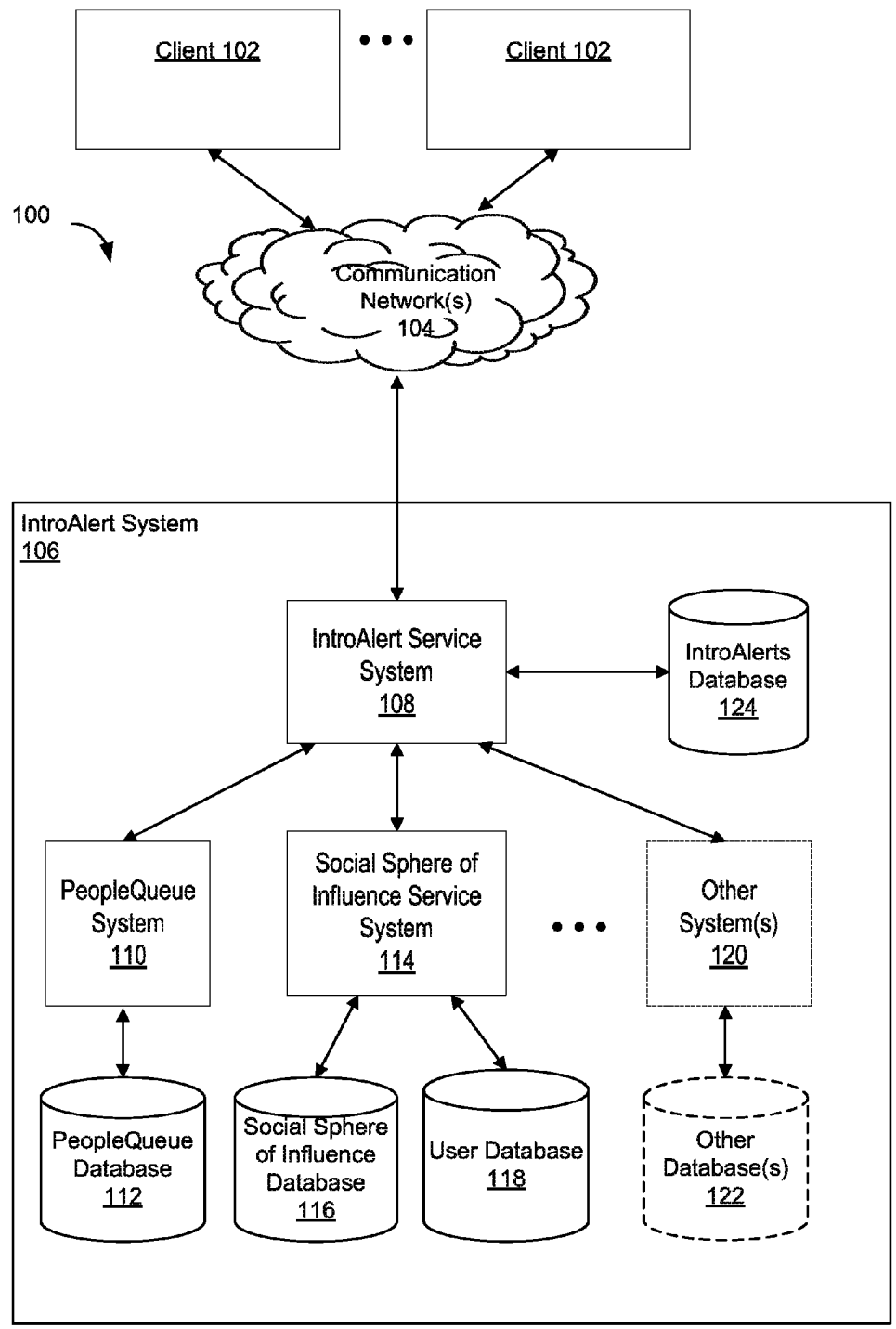
FIG. 1 is a block diagram illustrating an exemplary distributed computer system in accordance with some embodiments.

FIG. 1 is a block diagram illustrating an exemplary distributed computer system 100 in accordance with some embodiments. A plurality of clients 102 (e.g., user terminals such as portable devices including one or more cell phones, tablets, laptops, smart watches, etc. and/or e.g., stationary device such as desk top computers, home entertainment systems, personal or group networks, etc) are coupled via one or more communication networks 104 to an introduction alert (IntroAlert) system 106. It is noted that a plurality of clients 102 may be associated with one user's account. However, in most embodiments the introduction alert system 103 communicates with numerous user accounts using numerous clients 102 simultaneously.

In some embodiments, the introduction alert system 106 includes an introduction alert (IntroAlert) service system 108, which provides alerts to one or more clients 102 when one or more alert conditions are met. For example, in some embodiments, the introduction alert is provided when a person the user desires to meet (the target) first appears in the user's social sphere of influence. The provision of these alerts will be explained in more detail in throughout this application.

The following is a high level overview of the introduction alert system 106, which will be explained in more detail with respect to FIG. 2. The introduction alert system 106 includes an introduction alert service 108, which is a system which provides alerts to one or more clients 102 when one or more alert conditions are met. The introduction alert service system 108 is coupled to or in communication with a PeopleQueue System 110. The PeopleQueue system 110 is configured to receive names (or other indicators) of targets that a user wishes to meet, and store them, sometimes along with other information about in the PeopleQueue database 112, as a PeopleQueue record associated with the user. The other information associated with the PeopleQueue record may, for example, be obtained from other systems 120 and other databases 122, which are optionally coupled to or in communication with the introduction alert service system 108. In some embodiments, the other systems 120 and other databases 122 may include email systems, social networking systems, and other websites and services, which are optionally used to obtain connection information, activity information, interests, and/or insights about the user, the target, or primary and secondary connections to the user. The introduction alert service system 108 is coupled to or communicates with a Social Sphere of Influence (SSOI) Service System 114. The user's social sphere of influence is made up of the user's primary and secondary connections, and is stored in the Social Sphere of Influence (SSOI) Database 116. The Social Sphere of Influence (SSOI) Service System 114 is coupled to or communicates with both the Social Sphere of Influence (SSOI) Database 116 and the User Database 118. In some embodiments, the Social Sphere of Influence Service System 114 periodically updates a social sphere of influence for one or more users by checking at least the User Database 118, and optionally Other Database(s) 122, recalculating the user's social sphere of influence and then storing the updates in the Social Sphere of Influence database 116 as will be explained in more detail in FIG. 7. The introduction alert service system 108 is coupled to or communicates with an introduction alerts (IntroAlerts) Database 124. The introduction alerts database 124 stores information regarding the introduction alerts that have been provided to the user, such as for example, the name of the target, when the alert was provide, and information regarding the strength of the connection between the user and the target. As such, in some embodiments, the introduction alert service system 108 checks the introduction alerts database 124 to determine if an introduction alert about the target has been previously sent, and if a new introduction alert should be provided (because, for example, the connection strength to the target has increased.)

In some embodiments, the introduction alert system 106 includes any or all of: the introduction alert service system 108, PeopleQueue System 110, PeopleQueue Database 112, Social Sphere of Influence Service System 114, Social Sphere of Influence Database 116, User Database 118, (optional) Other Systems 120, (optional) Other Database(s), and the Introduction Alerts Database (124) 118 are components of a single server system comprising one or more processing units (CPU's), one or more network or other communications interfaces, memory, and one or more communication buses for interconnecting these components to other conventional electronic components and may be programmed with processor-executable instructions to facilitate communication via network 104 and perform various aspects of the below describe embodiments. In other embodiments, one or more of the above mentioned components are separate systems having their own one or more processing units (CPU's), one or more network or other communications interfaces, memory, and one or more communication buses for interconnecting these components to other conventional electronic components and may be programmed with processor-executable instructions to facilitate communication via network 104 and perform various aspects of the below describe embodiments. For example, FIGS. 2, 3A, and 3B provide some exemplary embodiments of some of the components of the distributed computer system 100 illustrated in FIG. 1.

In some embodiments, memory used by any of the clients 102 or any of the components of the introduction alert system 106 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory optionally includes one or more storage devices remotely located from the CPU(s). In some embodiments, memory, or alternately the non-volatile memory device(s) within memory, comprises a non-transitory computer readable storage medium (as explained in more detail in FIGS. 2, 3A and 3B.)

Furthermore, one skilled in the art will appreciate that the network 104 is not limited to a particular type of network. For example, the network 104 may feature one or more wide area networks (WANs), such as the Internet. The network 104 may also feature one or more local area networks (LANs) having one or more of the well-known LAN topologies and the use of a variety of different protocols on these topologies, such as Ethernet, TCP/IP, Frame Relay, Ethernet, FTP, HTTP and the like, is presumed. Moreover, the network 104 may feature a Public Switched Telephone Network (PSTN) featuring landline and cellular telephone terminals, or else a network featuring a combination of any or all of the above. The clients 102 may be coupled to network 104 via, for example, twisted pair wires, coaxial cable, fiber optics, electromagnetic waves or other media.

Figure 2:
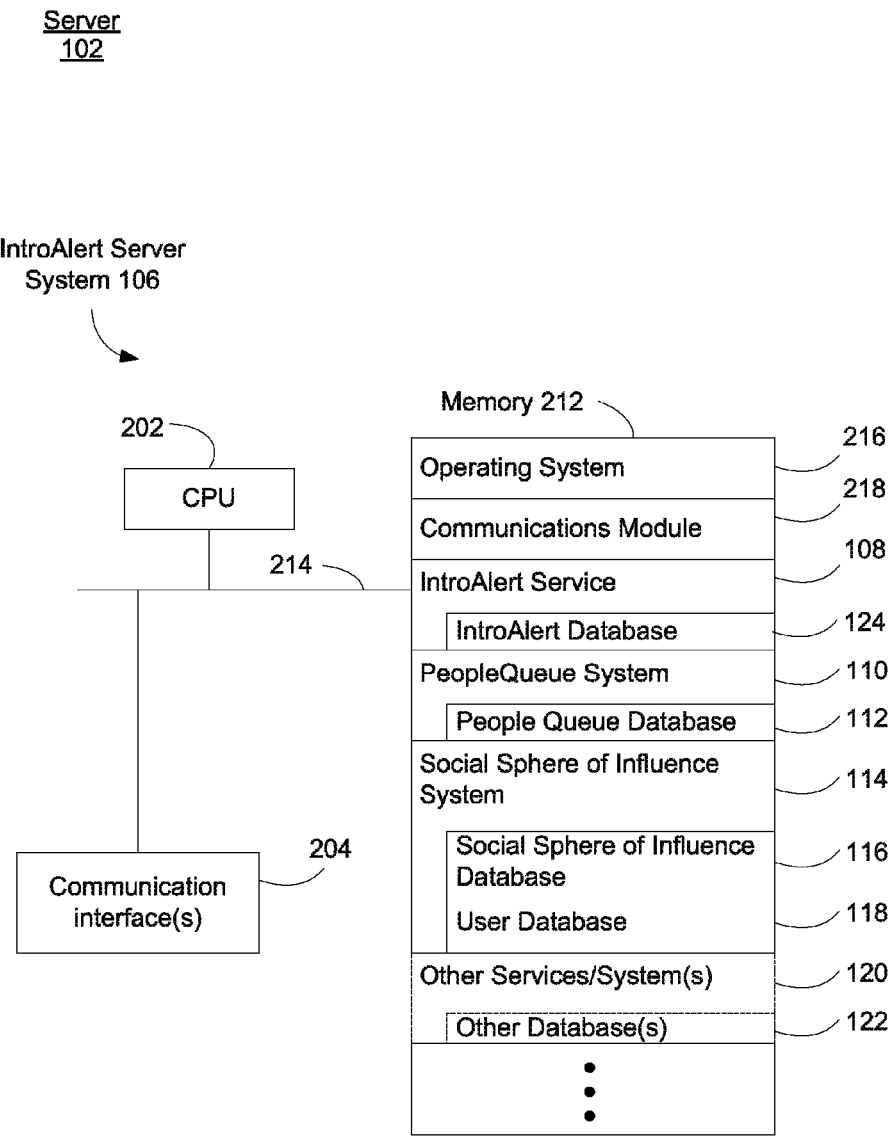
FIG. 2 is a block diagram illustrating an introduction alert (IntroAlert) system 106 in accordance with some embodiments.
Figure 3A:
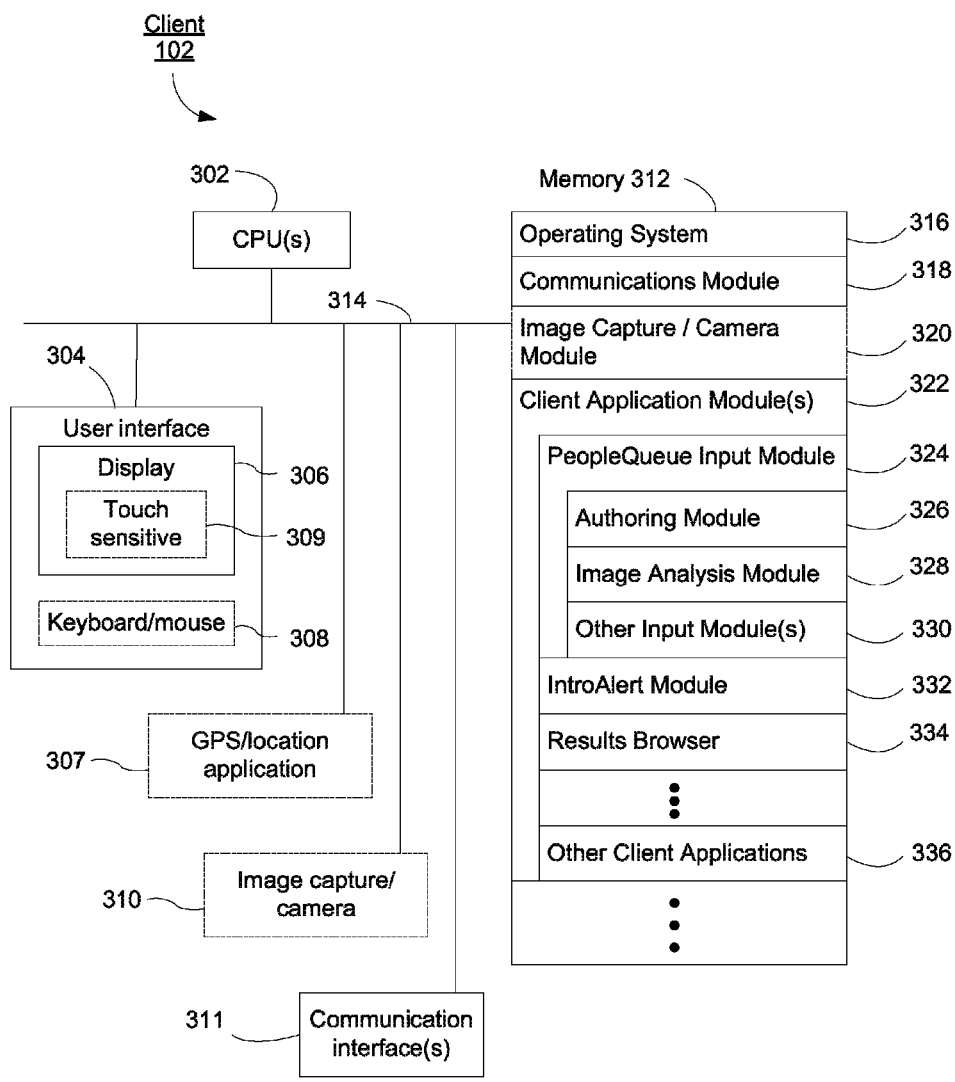
FIGS. 3A and 3B are block diagrams illustrating two exemplary clients in accordance with some embodiments.
Figure 3B:
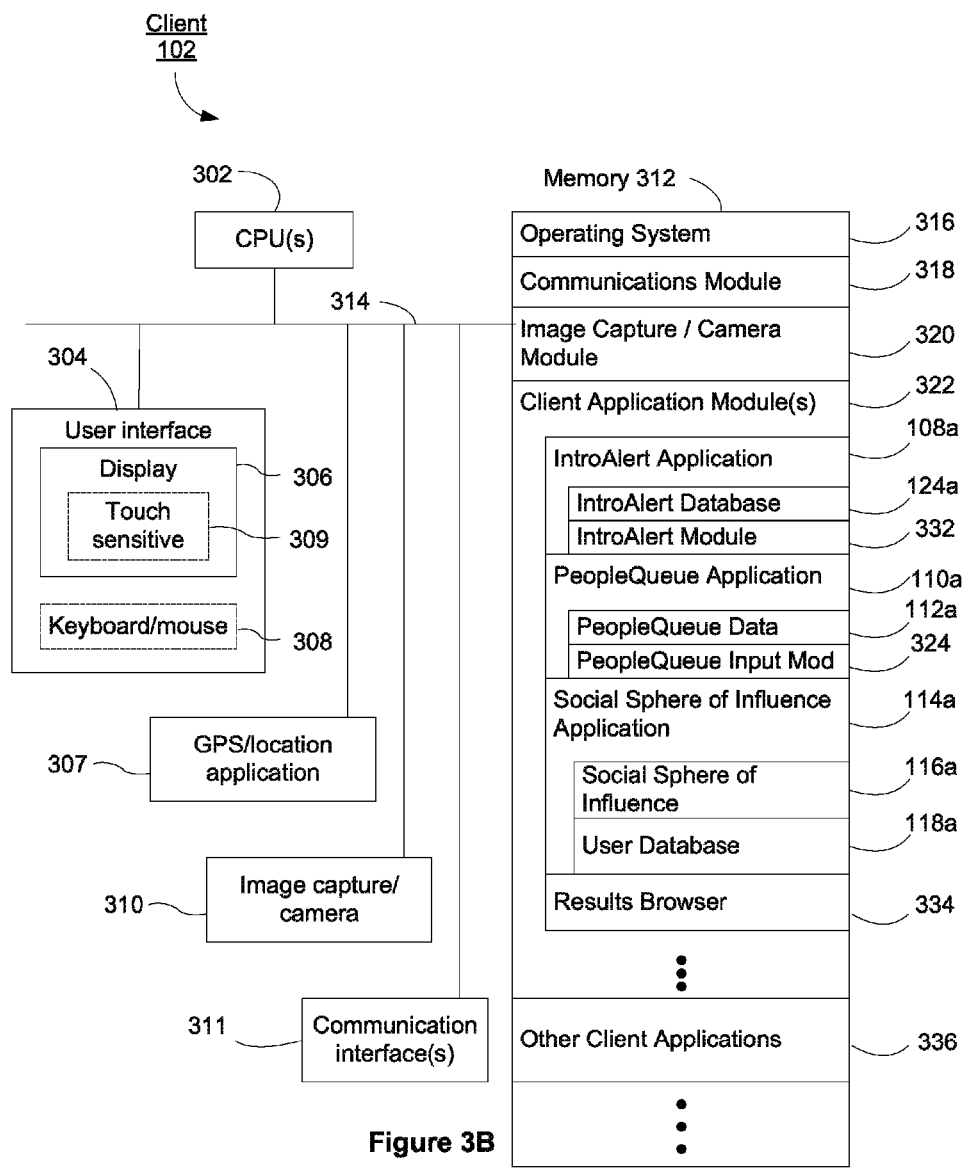
Figure 11:
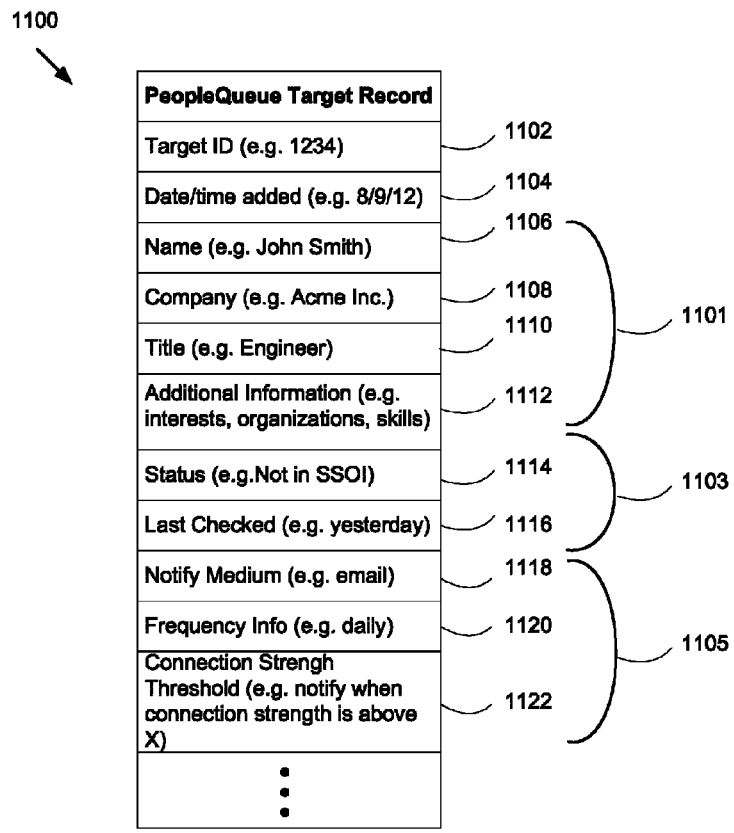
FIG. 11 illustrates an exemplary target record, according to some embodiments.
Figure 12:
FIG. 12 illustrates an exemplary introduction alerts record, according to some embodiments.

FIG. 2 is a block diagram illustrating an introduction alert (IntroAlert) system 106 in accordance with some embodiments. The introduction alert (IntroAlert) system 106 is typically a server system including one or more processing units (CPU's) 202, one or more network or other communications interfaces 204, memory 212, and one or more communication buses 214 for interconnecting these components. The communication buses 214 optionally include circuitry (sometimes called a chipset) that interconnects and controls communications between system components. The introduction alert system 106 optionally includes a user interface (such as a display device and a input mechanism) not shown in this embodiment. Memory 212 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices, as discussed with respect to FIG. 1. Memory 212 optionally includes one or more storage devices remotely located from the CPU(s) 202. Memory 212, or alternately the non-volatile memory device(s) within memory 212, comprises a non-transitory computer readable storage medium. In some embodiments, memory 212 or the computer readable storage medium of memory 212 stores the following programs, modules and data structures, or a subset thereof:

- an operating system 216 that includes procedures for handling various basic system services and for performing hardware dependent tasks;
- a network communication module 218 that is used for connecting the introduction alert system 106 to other computers via the one or more communication network interfaces 204 (wired or wireless) and one or more communication networks, such as the Internet, other wide area networks, local area networks, metropolitan area networks, and so on;

an introduction alert (IntroAlert) service system 108, for providing alerts to one or more clients 102 when one or more alert conditions are met, such as for example when a target record matches one of the secondary connections of the user as will be explained in more detail with respect to FIG. 5. In some embodiments, introduction alert service system 108 is configured to communicate with the introduction alerts database 124, the PeopleQueue System 110, the Social Sphere of Influence System 114, and optionally other services and systems 120 to determine whether an alert condition is met and to provide an introduction alert.

an introduction alerts database 124, for storing information regarding any or all of the introduction alerts that were previously provided to the users of the system (e.g. stored in association with each user). As shown in FIG. 12 a record in the introduction alerts database 124 may include for example, the name of the target, when the alert was provide, and information regarding the strength of the connection between the user and the target.

a PeopleQueue System 110, for receiving names (or other indicators) of targets that a user wishes to meet, analyzing, and storing them, sometimes along with other information about in its the PeopleQueue database 112.

a PeopleQueue Database 112 for storing PeopleQueue Target Records associated with a user. As shown in FIG. 11, a PeopleQueue Target Record may include for example a target's indicator (such as a name or title) as well as the other information about the target obtained by the PeopleQueue System 110.

a Social Sphere of Influence (SSOI) Service System 114 for periodically updating a social sphere of influence for one or more users by checking at least the User Database 118 (and optionally Other Database(s) 122), recalculating the user's social sphere of influence, and then storing the updates in the Social Sphere of Influence database 116 as will be explained in more detail in FIG. 7.

a Social Sphere of Influence (SSOI) Database 116 for storing one or more users' social spheres of influence. A user's social sphere of influence is made up of the user's primary and secondary connections.

a User Database 118 for storing user account data such as for example a user's contact information, IntroAlert account and preferences, primary connections from one or more services external to the introduction alert service 108, and/or information regarding the user's current location.

optional Other Services and/or Systems 120 such as email systems, social networking systems, and other websites and services, which are optionally queried for connection information, activity information, interests, and/or insights about the user, the target, or primary and secondary connections to the user; and optional Other Databases 122, which are for storing information associated with the Other Services/Systems 120 described above.

Each of the above identified elements is typically stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 212 stores a subset of the modules and data structures identified above. Furthermore, memory 212 may store additional modules and data structures not described above.

Although FIG. 2 shows an "introduction alert system" 106, FIG. 2 is intended more as functional description of various features present in a set of servers than as a structural schematic of the embodiments described herein. In practice, and as recognized by those of ordinary skill in the art, items shown separately could be combined and some items could be separated. For example, some items shown separately in FIG. 2 could be implemented on single servers and single items could be implemented by one or more servers. Furthermore, some of the components could be implemented and stored on a client system is described with respect to FIGS. 3A and 3B. The actual number of servers used to implement an introduction alert system 106 and how features are allocated among them will vary from one implementation to another, and typically depend in part on the amount of data traffic that the system must handle during peak usage periods as well as during average usage periods.

Figure 14:
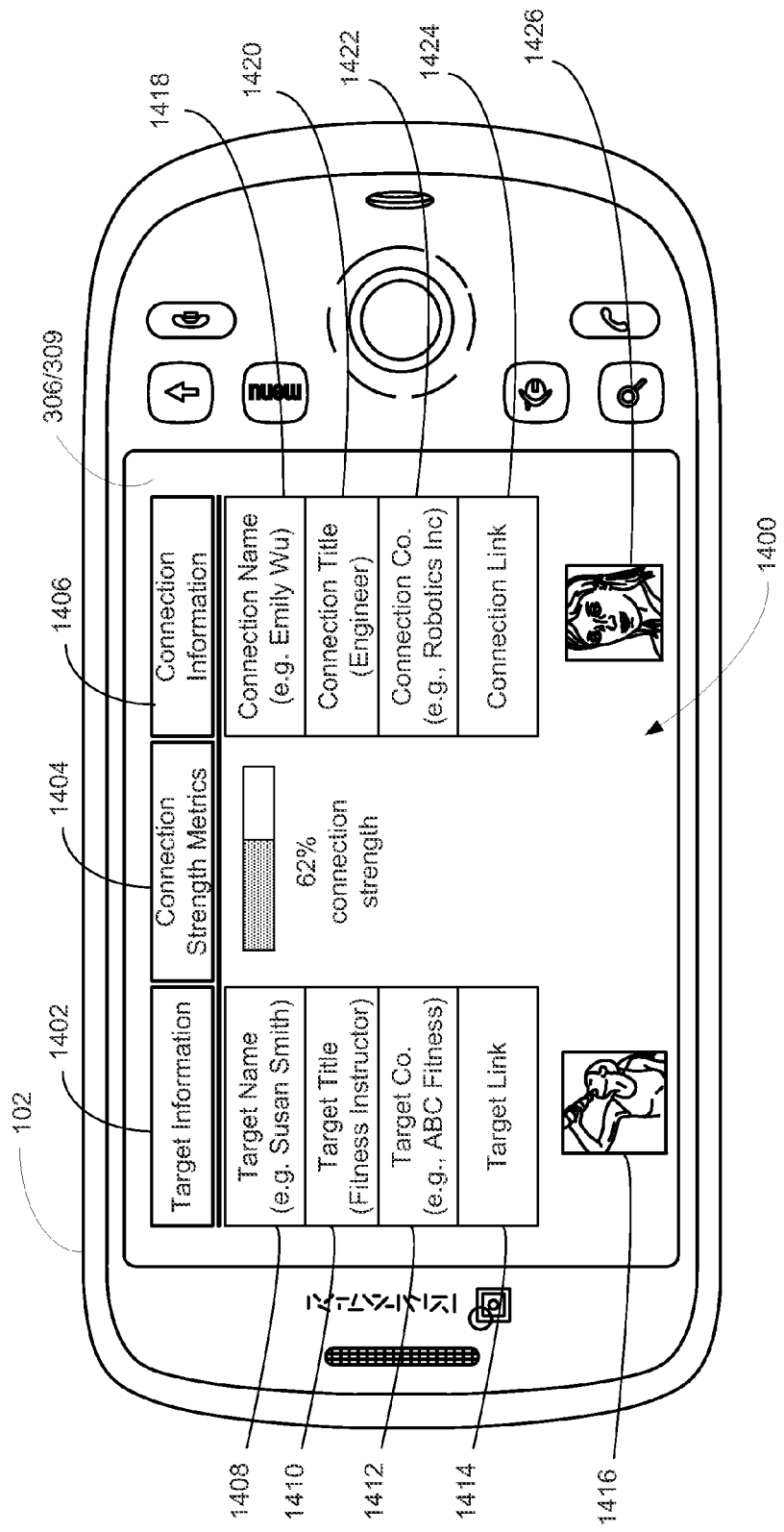
FIG. 14 illustrates an exemplary client display of an alert, according to some embodiments.
Figure 15:
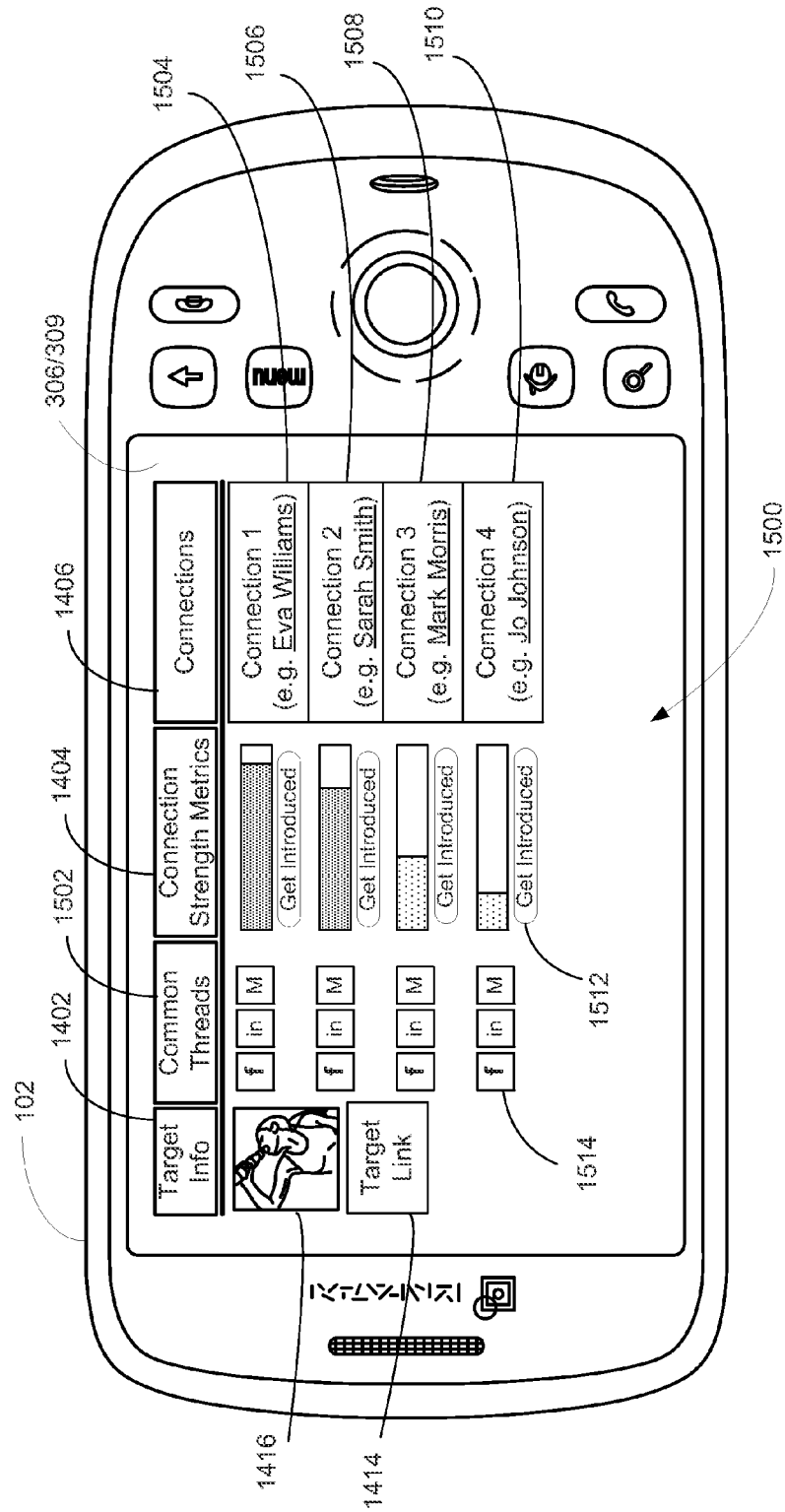
FIG. 15 illustrates another exemplary client display of an alert, according to some embodiments.
Figure 16:
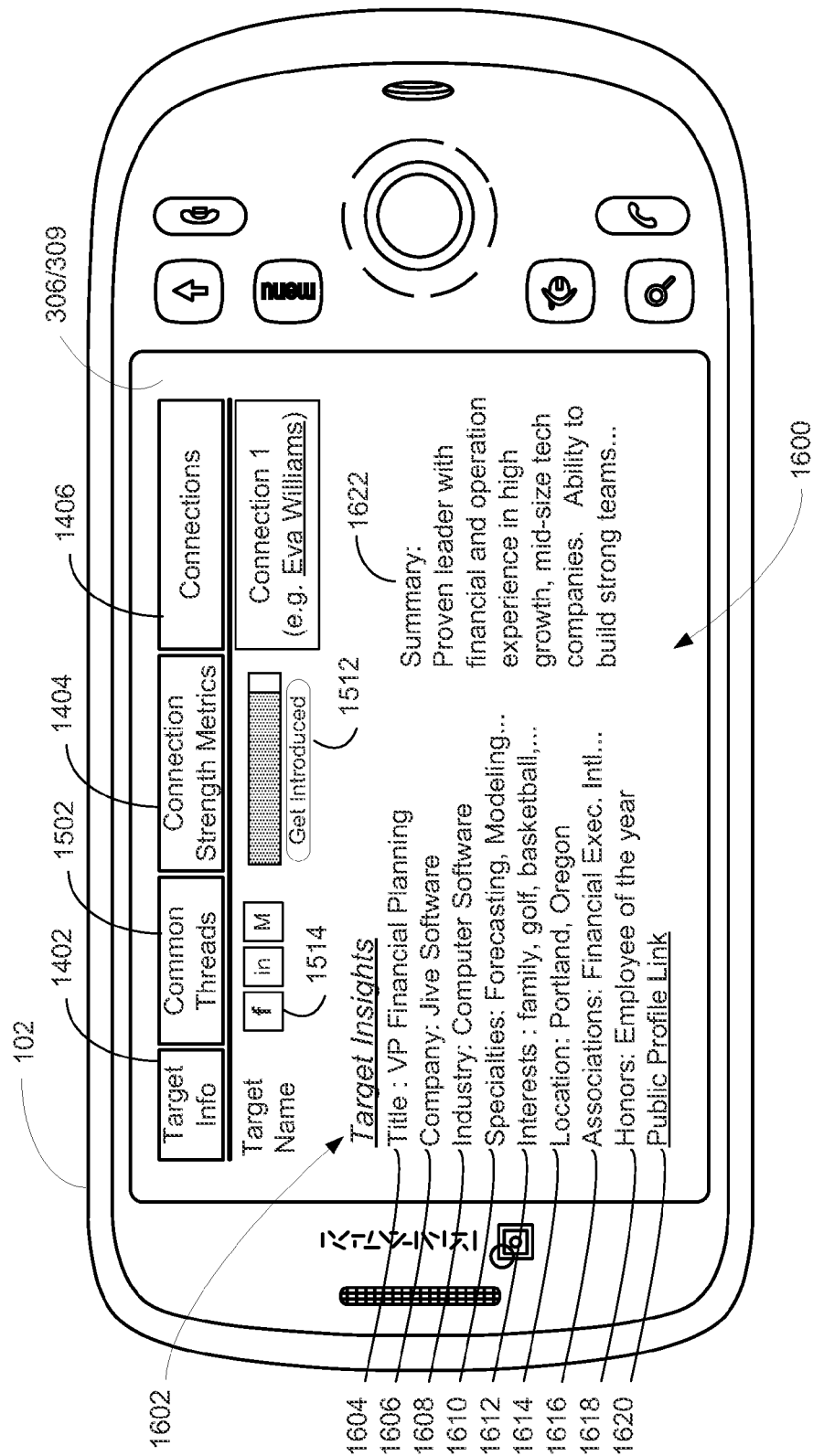
FIG. 16 illustrates an exemplary client display of detailed information regarding the target associated with an alert, according to some embodiments.

FIG. 3A is a block diagram illustrating a thin client 102, in accordance with some embodiments. The client system 102 typically includes one or more processing units (CPU's) 302, one or more network or other communications interfaces 311, memory 312, and one or more communication buses 314 for interconnecting these components. The communication buses 314 optionally include circuitry (sometimes called a chipset) that interconnects and controls communications between system components. The client system 102 includes a user interface 304. The user interface 304 may include a display device 306 with an optional touch sensitive screen 309 and/or optional other input mechanism such as a keyboard and/or mouse 308. In some embodiments, client system 102 may have a touch screen display without a keyboard (e.g., a soft keyboard may be displayed when keyboard entry is needed), and some client systems may use a microphone and voice recognition to replace the keyboard. Optionally, in some embodiments, the client system 102 also includes an image capture device 310 such as a camera or scanner. In some embodiments, the client system 102 also includes a location application 307 such as for example GPS. Memory 212 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices, as discussed with respect to FIG. 1. Memory 312 optionally includes one or more storage devices remotely located from the CPU(s) 302. Memory 312, or alternately the non-volatile memory device(s) within memory 312, comprises a non-transitory computer readable storage medium. In some embodiments, memory 312 or the computer readable storage medium of memory 312 stores the following programs, modules and data structures, or a subset thereof:

an operating system 316 that includes procedures for handling various basic system services and for performing hardware dependent tasks;

a network communication module 318 that is used for connecting the client system 102 to other computers via the one or more communication network interfaces 311 (wired or wireless) and one or more communication networks, such as the Internet, other wide area networks, local area networks, metropolitan area networks, and so on;

an optional image capture module 320 for processing and providing a respective image captured by the image capture device/camera 310, where the respective image, or a portion thereof, is used as an indicator for a target. In some embodiments, the PeopleQueue System 110 or an image recognition service utilized by the PeopleQueue System 110 will process the image to recognize other information regarding the target (e.g., a portion of text of the image may be OCRed to obtain a target name, or facial recognition software may be employed to obtain a target name for a face in the image), in other embodiments local processing is performed by the Image Analysis Module 328;

one or more client application modules 322 for handling various aspects of providing introduction alerts. For the thin client embodiment depicted in FIG. 3A the application modules include but not limited to:

a PeopleQueue Input Module 324, for receiving names (or other indicators) of targets that a user wishes to meet, and optionally performing some analysis on them. In some embodiments, the PeopleQueue Input Module 324 includes an Authoring Module 326, configured to allow a user to manually input an indicator for a target (e.g., typing the target's name or enable a user to select a sub-portion of an image captured by the camera 210). In some embodiments, PeopleQueue Input Module 324 includes an optional Image Analysis Module 328, to process or that pre-process an image received from the image capture module 320 to create and provide an indicator for a target in the image (e.g., a portion of text of the image may be OCRed to obtain a target name, or facial recognition software may be employed to obtain a target name for a face in the image). In some embodiments, one or more Other Input Module(s) 330 are employed to provide indicators of targets. For example, in some embodiments a name identification services is utilized to identify names of people in textual content, and provide those names with an option to for example select a button to "add this person to my PeopleQueue." It is noted that a variety of other options for obtaining indicators for targets from a user are also described with respect to FIGS. 4A and 4B.

an introduction alerts module 332, for receiving introduction alert from the introduction alert service 108 and providing it to the user. In some embodiments, the alert is an audio alert (such as a beeping of the client device). In some embodiments, the alert is a physical alert (such as vibration of the client device). In some embodiments, the alert is a visual alert such as those shown in FIGS. 14-16 (providing for example information about the connection strength of the user or a primary connection and the target).

a results browser 334 for displaying information regarding the introduction alerts system such as PeopleQueue suggestions, information regarding the user, primary contacts, and secondary contacts, and for displaying alerts such as those illustrated in FIGS. 14-16.

other client applications 336 such internet applications (e.g. websites and web services), email applications, social networking applications, document processing applications, content playing applications, etc. These other client applications are optionally used by various modules of the PeopleQueue Input Module 324 for suggested or selectable indicators for targets. The other Client Applications 334 are also optionally queried by the client 102 or the introduction alerts server system 16 for primary and secondary connection information, activity information, interests, and/or insights about the user, the target, or primary and secondary connections to the user.

FIG. 3B is a block diagram illustrating a thick client 102, in accordance with some embodiments. It is noted that a benefit of using a thick client 102, which performs a variety of the aspects of providing introduction alerts on the client rather than on the server as described with respect to FIG. 2, is that the user's information (such as a user's social sphere of influence and/or the user's account data and preferences) are stored locally on the client device 102, rather than remotely. As such, some users may prefer local storage due to privacy concerns. The client system 102 typically includes one or more processing units (CPU's) 302, one or more network or other communications interfaces 311, memory 312, and one or more communication buses 314 for interconnecting these components. The communication buses 314 optionally include circuitry (sometimes called a chipset) that interconnects and controls communications between system components. The client system 102 includes a user interface 304. The user interface 304 may include a display device 306 with an optional touch sensitive screen 309 and/or optional other input mechanism such as a keyboard and/or mouse 308. In some embodiments, client system 102 may have a touch screen display without a keyboard (e.g., a soft keyboard may be displayed when keyboard entry is needed), and some client systems may use a microphone and voice recognition to replace the keyboard. Optionally, in some embodiments, the client system 102 also includes an image capture device 310 such as a camera or scanner. In some embodiments, the client system 102 also includes a location application 307 such as for example GPS. Memory 212 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices, as discussed with respect to FIG. 1. Memory 312 optionally includes one or more storage devices remotely located from the CPU(s) 302. Memory 312, or alternately the non-volatile memory device(s) within memory 312, comprises a non-transitory computer readable storage medium. In some embodiments, memory 312 or the computer readable storage medium of memory 312 stores the following programs, modules and data structures, or a subset thereof:

an operating system 316 that includes procedures for handling various basic system services and for performing hardware dependent tasks;

a network communication module 318 that is used for connecting the client system 102 to other computers via the one or more communication network interfaces 311 (wired or wireless) and one or more communication networks, such as the Internet, other wide area networks, local area networks, metropolitan area networks, and so on;

an optional image capture module 320 for processing and providing a respective image captured by the image capture device/camera 310, where the respective image, or a portion thereof, is used as an indicator for a target. In some embodiments, the PeopleQueue System 110 or an image recognition service utilized by the PeopleQueue System 110 will process the image to recognize other information regarding the target (e.g., a portion of text of the image may be OCRed to obtain a target name, or facial recognition software may be employed to obtain a target name for a face in the image), in other embodiments local processing is performed by the Image Analysis Module 328;

one or more client application modules 322 for handling various aspects of providing introduction alerts. For the thick client embodiment depicted in FIG. 3B the application modules include but not limited to:

an introduction alert (IntroAlert) application 108a, for providing alerts to when one or more alert conditions are met, such as for example when a target record matches one of the secondary connections of the user as will be explained in more detail with respect to FIG. 4B. In some embodiments, introduction alert service system 108 is configured to communicate with the introduction alerts database 124a, the PeopleQueue Application 110a, the Social Sphere of Influence Application 114a, the results browser 328 and optionally other services and systems 120 to determine whether to provide an introduction alert.

an introduction alerts database 124a, for storing information regarding any or all of the introduction alerts that were previously provided to the user of the client 102. As shown in FIG. 12 a record in the introduction alerts database 124 may include for example, the name of the target, when the alert was provide, and information regarding the strength of the connection between the user and the target.

an introduction alerts module 332, for receiving introduction alert from the introduction alert module 108a and providing it to the user. In some embodiments, the alert is an audio alert (such as a beeping of the client device). In some embodiments, the alert is a physical alert (such as vibration of the client device). In some embodiments, the alert is a visual alert such as those shown in FIGS. 14-16 (providing for example information about the connection strength of the user or a primary contact and the target).

a PeopleQueue Application 110a, for receiving names (or other indicators) of targets that a user wishes to meet, analyzing, and storing them, sometimes along with other information about in its the PeopleQueue database 112a. It is noted that in some embodiments the PeopleQueue Application 110a may communicate with and obtain information about the target(s) from a PeopleQueue System 110 on the introduction alerts server system 106.

a PeopleQueue Database 112 for storing PeopleQueue Target Records associated with the user of the client 102. As shown in FIG. 11, a PeopleQueue Target Record may include for example a target's indicator (such as a name or title) as well as the other information about the target obtained by the PeopleQueue System 110.

a PeopleQueue Input Module 324, for receiving names (or other indicators) of targets that a user wishes to meet, and optionally performing some analysis on them. Although not illustrated in FIG. 3B, on some embodiments, the PeopleQueue Input Module 324 includes an Authoring Module 326, and/or an optional Image Analysis Module 328, and/or one or more Other Input Module(s) 330 to provide indicators of targets, as discussed in more detail with respect to FIG. 3A.

a Social Sphere of Influence (SSOI) Application 114a for periodically updating a social sphere of influence for one or more users by checking communicating with the at least the User Database 118 (and optionally Other Database(s) 122) on the introduction alert server system 106, as well as the user's personal database 118a, and recalculating the user's social sphere of influence, and then storing the updates in the Social Sphere of Influence database 116a as will be explained in more detail in FIG. 7.

a Social Sphere of Influence (SSOI) Database 116a for storing on the social spheres of influence for the user of the client 102. A user's social sphere of influence is made up of the user's primary and secondary connections.

a User Database 118a for storing user account data such as for example a user's contact information, IntroAlert account and preferences, primary connections from one or more services external to the introduction alert service 108, and/or information regarding the user's current location.

a results browser 334 for displaying information regarding the introduction alerts system such as PeopleQueue suggestions, information regarding the user, primary contacts, and secondary contacts, and for displaying alerts such as those illustrated in FIGS. 14-16.

other client applications 336 such internet applications (e.g. websites and web services), email applications, social networking applications, document processing applications, content playing applications, etc. These other client applications are optionally used by various modules of the PeopleQueue Input Module 324 for suggested or selectable indicators for targets. The other Client Applications 334 are also optionally queried by the client 102 or the introduction alerts server system 16 for primary and secondary connection information, activity information, interests, and/or insights about the user, the target, or primary and secondary connections to the user.

Each of the above identified elements of FIGS. 3A and 3B is typically stored in on the client, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 212 stores a subset of the modules and data structures identified above. Furthermore, memory 212 may store additional modules and data structures not described above.

Figure 4A:
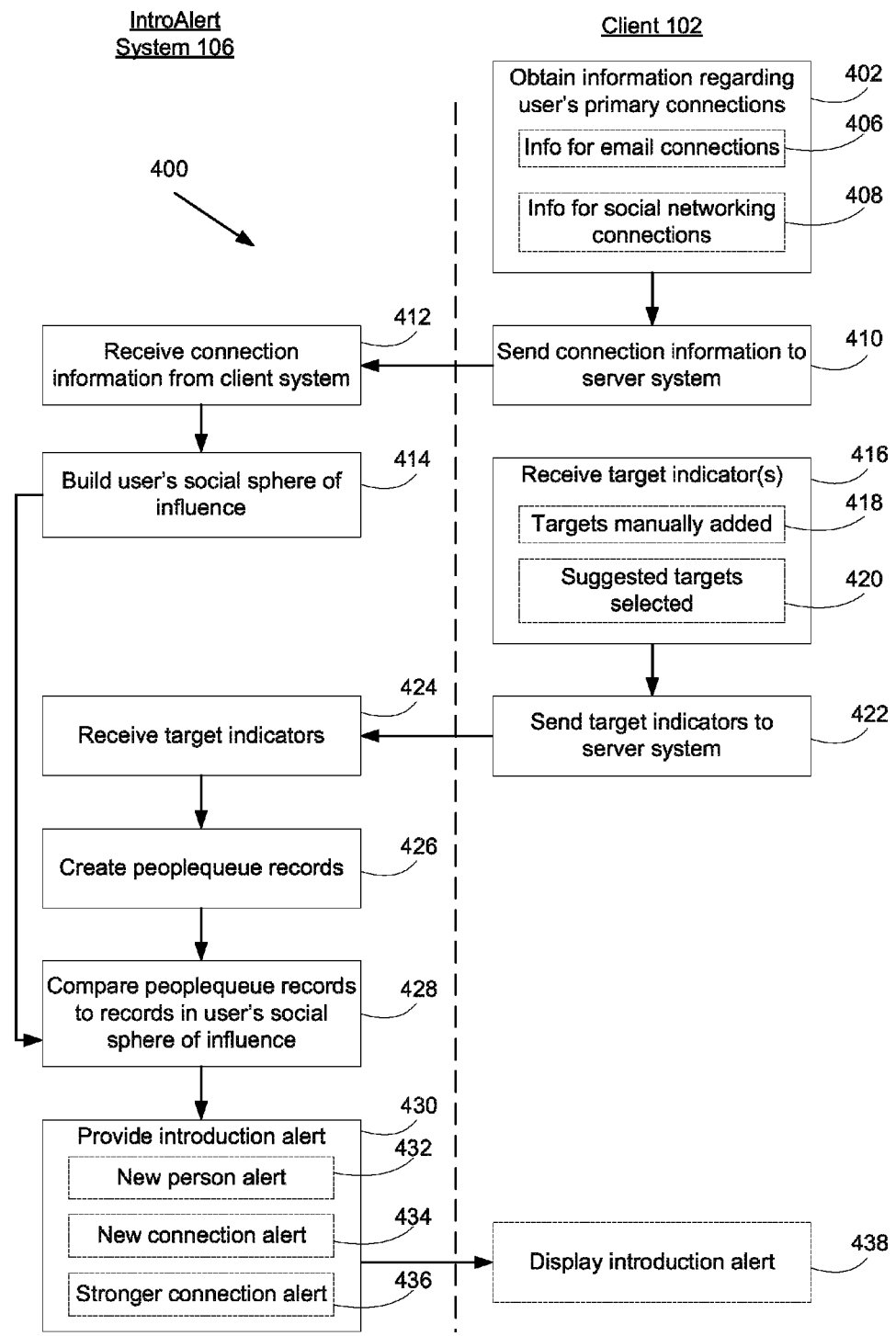
FIGS. 4A and 4B are flowcharts representing methods for server client communication in providing one or more introduction alerts, according to some embodiments.

Although FIGS. 3A and 3B show embodiments of a thin and thick client 102, FIGS. 3A and 4A are intended more as functional description of various features present in a set of servers than as a structural schematic of the embodiments described herein. In practice, and as recognized by those of ordinary skill in the art, items shown separately could be combined and some items could be separated. For example, some items shown separately in FIG. 3B could be combined. Furthermore, some of the components shown in FIG. 3B could be implemented and stored on a client system shown in FIG. 3A. How the features are allocated among FIGS. 2, 3A, and 3B will vary from one implementation to another.

Figure 4B:
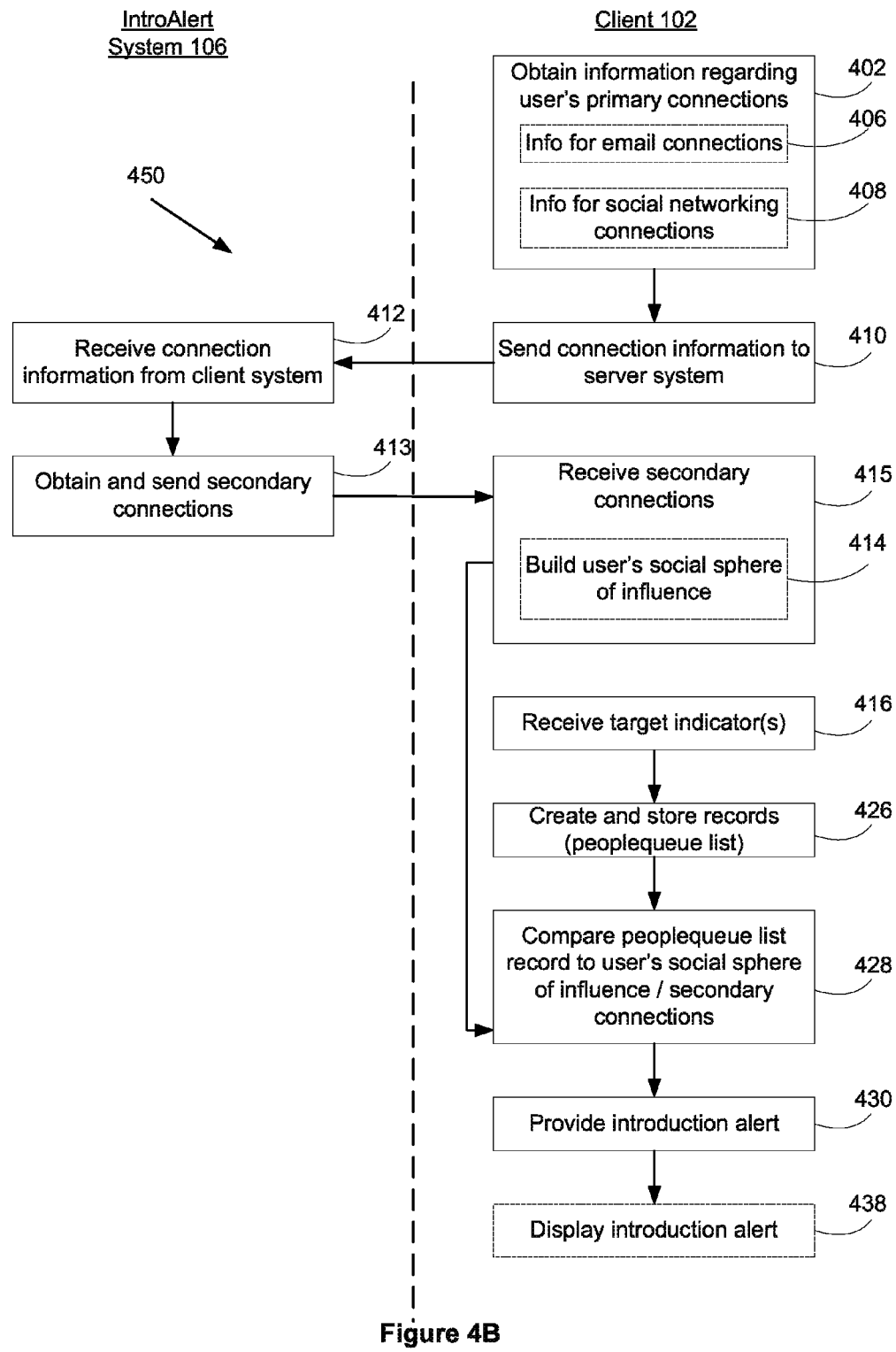

FIGS. 4A and 4B are flowcharts representing methods 400 and 450 for providing one or more introduction alerts, according to some embodiments. More detail regarding some of the steps shown in FIGS. 4A and 4B is provided in FIGS. 5-7. The methods 400/540 are typically governed by instructions that are stored in memory or a computer readable storage medium and that are executed by one or more processors of one or more clients 102 and introduction alert system servers 106.

Each of the operations shown in FIGS. 4A and 4B typically corresponds to instructions stored in a computer memory or non-transitory computer readable storage medium. The computer readable storage medium typically includes a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors. Specifically many of the operations shown in FIGS. 4A and 4B correspond to modules of the client systems 102 shown in FIGS. 3A and 3B or services and systems of the introduction alerts server system 106 shown in FIG. 2. The above identified modules or programs (i.e., sets of instructions) need not be implemented as separate software programs, procedures or modules, and thus various subsets of these modules will be combined or otherwise re-arranged in various embodiments.

Figure 9:
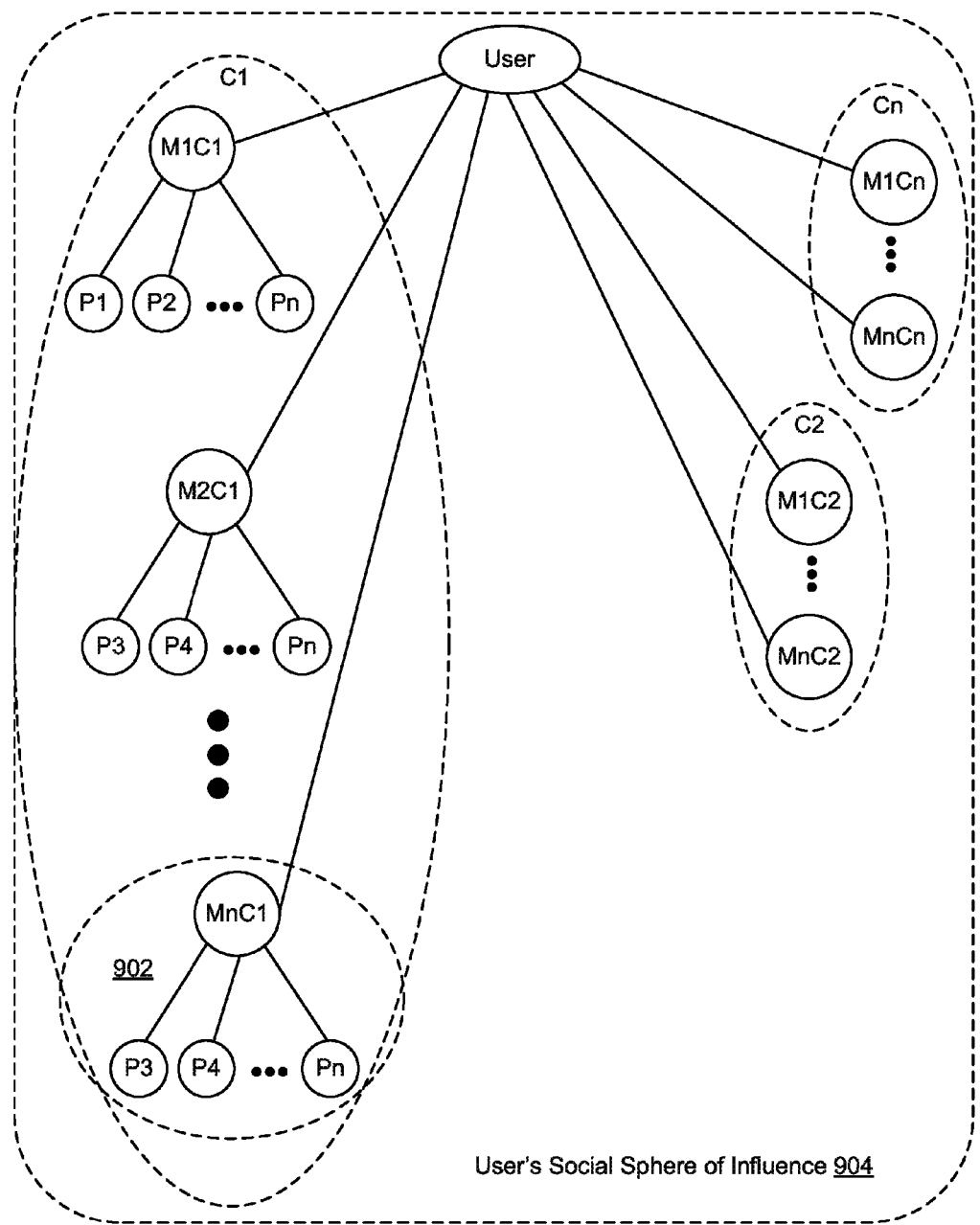
FIG. 9 illustrates an exemplary social sphere of influence for a user, in accordance with some embodiments.

In FIG. 4A, the client 102 obtains information regarding the user's primary connections (402). The user's primary connections are contacts or friends of the user. In some embodiments, connections and contacts can be verified with an external source or program separate from the introduction alerts system. For example, a person with which the user has two way communications via, email, IM, phone, social media, or other communications is a primary connection. Furthermore, a person deemed a friend or contact via a social networking service is also a primary connection. In some embodiments, members of a shared group are also primary connections, as shown in FIG. 9. Unidirectional or "follow" relationships alone are not primary connections. In some embodiments, the information regarding the primary connections is obtained for email connections (406). As such, in some embodiments, the primary connections are obtained by the client from one or more email services. In other embodiments, and the client provides the server access credentials to their email service(s) and the server obtains the contacts from the email service(s) by sending a request for the contacts to the email service and receiving a response from the email service including the contact information. In some embodiments, the information regarding the primary connections is obtained for social networking connections (408). As such, in some embodiments, the primary connections are obtained by the client from one or more social networking services. In other embodiments, and the client provides the server access with credentials to their social network and the server obtains the primary connections from the various social networks by similarly requesting and receiving the connection information from the social networking service. For exemplary purposes, email and social networking systems are sources for obtaining information regarding primary connections which are illustrated herein, but it is noted that many other sources such as phone systems, IM systems, location based networking systems, etc also used in some embodiments to obtain information regarding the user's primary connections (402). The connection information is then sent to the introduction alerts server system 106. (410).

The introduction alerts server system 106 receives the connection information (412) either as connections themselves, or as information (such as access credentials) from which the connections are then obtained by the introduction alerts server system 106, or a combination of the two. Once all the primary connections are obtained, using the user's primary connections, the introduction alerts server system 106 then builds the user's social sphere of influence (414). The user's social sphere of influence includes the user's primary and secondary connections. The details of building a social sphere of influence are described in more detail with respect to FIG. 7.

The client 102 also receives one or more target indicators (416). A target is person the user desires to meet. A target indicator can be one or more of a name, an image, a title, a company or organization association, a skill (e.g. UX expert), and interest, etc. In some embodiments the target's name is the preferred indicator. In some embodiments, the user to manually inputs an indicator for a target (418). For example, the user types the target's name or highlights a name within a webpage and chooses to have the name become a target indicator. In some embodiments, the user provides a captured image or a selected portion thereof (e.g., a scanned image, a photograph from the user's camera, or an image in a webpage or video selected by the user.) In some embodiments, when an image is provided by the user it undergoes further processing (e.g., OCR and/or image recognition) to identify names or other information used as a target indicator, as described with respect to FIGS. 3A and 3B. In some embodiments, the user selects a suggested target (420). For example, in some embodiments a name identification services (such as a browser plug in) is utilized to identify names of people in textual content currently being viewed by the user, and provide those names with an option to for example select a button to "add this person to my PeopleQueue," and so the user can add names by selecting the suggested target names. In other embodiments, a JavaScript snippet is included in a website which creates a list of names of people includes on a page, such that the user click on a name in the list to be a target indicator. In some embodiments, web and mobile developers use an API provided to them by the introduction alert service to enable users to add a target indicator from an external website or mobile application. In yet other embodiments, the introduction alert system (e.g. the Social Sphere of Influence Service System) provides suggested target indicators based on information gathered about the user. For example, a people the user follows on another system is suggested as a target, or a person sharing characteristics with other people the user already has on his PeopleQueue list is suggested (e.g., a person employed at the same company and having the same title as someone already on the user's PeopleQueue list), or a person sharing characteristics with the user (e.g., people having worked a the same employer or gone to the same school as the user), or contacts from an external customer relationship management system. Once the target indicators are received or obtained, they are sent to the introduction alerts server system (422).

The introduction alerts server system receives the target indicators (424). It then creates and stores records for the targets a based on the indicators (426). In some embodiments, the records are stored in a PeopleQueue list as illustrated in FIG. 10. The PeopleQueue list includes records for targets based at least on the indicators. Each PeopleQueue Target record comprises at least the received indicator. In many embodiments, the PeopleQueue Target record includes an identification number for the target as well as a variety of additional information about the target as shown in FIG. 11. In some embodiments, the PeopleQueue system 110 obtains the additional information about the target from by querying other systems 120 and other databases 122 such as email systems, social networking systems, and other websites and services for publicly available information which are optionally used to obtain connection information, activity information, interests, and/or insights about the target. In some embodiments, target information is also obtained from within the introduction alerts system when the target is also a user or primary connection of a user of the introduction alerts system (e.g., the social sphere of influence service system or its associated databases may contain information about the target).

The introduction alert system (specifically the introduction alert service system 108) compares a respective target record of the PeopleQueue list with a plurality of records in the user's social sphere of influence (428). In some embodiments, it determines if a target record matches one of the secondary connections of the user. In some embodiments, it determines if the target record matches a primary connection of the user. In yet other embodiments, it determines if the target record matches a primary or a secondary connection of the user.

When one or more alert conditions are met, the introduction alert system (specifically the introduction alert service system 108) provides an alert (430). The alert is an introduction alert, i.e., it provides an alert that a personal connection exists between the user and the target. In some embodiments, an alert is provided when a target record matches at least one of the secondary connections of the user. In other embodiments, an alert is provided when a first match condition is met. In some embodiments, the first match condition is that a target record of the PeopleQueue list matches at least one record in the user's social sphere of influence (primary or secondary connections). In some embodiments, the alert is provided to the client system's introduction alert module 332 for audio alert, physical alert, and/or visual display of the alert. In other embodiments, the alert is provided to an external system such as a push notification to a mobile device, an IM, an email, or even an automated voicemail.

In some embodiments, a new person alert is provided (432). The new person alert is provided when an alert for the respective target record was not previously provided, as verified by checking the introduction alerts database 124. In some embodiments, the alert is provided when a new person match condition is met. In some embodiments, the new person match condition is that the respective target record was not previously provided.

In some embodiments, a connection alert is provided (434). The new connection alert is provided when an introduction alert for the target was previously provided, but now the target record matches an additional secondary connection, as verified by checking the introduction alerts database 124. In other words, a different user's primary connection has a personal connection to the target than was provided in the previous alert. In some embodiments, the alert is provided when a new connection match condition is met. In some embodiments, the new connection match condition is that the target record of the PeopleQueue list matches at least an additional record in the user's social sphere of influence (e.g., the target is now a primary connection or the target is now personally connected to another primary connection of the user.) In some embodiments, the new connection match also requires a stronger match than the match of any previously provided match. In other words, the new connection match is not provided when the connection to the target in the new connection is weaker than the connection in a previously provided alert.

In some embodiments, a stronger connection alert is provided (436). The stronger connection alert is provided when the target record matches at least one of the secondary connections of the user and meets a connection strength threshold, as verified by checking one or more of the introduction alerts database 124, the user database 118, and the PeopleQueue database 112. In some embodiments, the alert is provided when a strength condition is met. In some embodiments, the strength condition is that the match meets a connection strength threshold. In some embodiments, the connection strength is a measure of the number of shared primary connections (determined for example by comparing social spheres of influence). In some embodiments, the connection strength includes an analysis one or more of: shared educational background, shared professional background, number of shared networks (e.g., connected to or communicating with each other via email, IM, social networking systems, phone, etc). In some embodiments, the connection strength also includes the primary connection's feedback score, which measures how effective the primary connection is at making introductions. In some embodiments, the connection strength threshold is user defined. In some implementations the user has the option of defining a connection strength threshold for an individual target. For example, the user may define the connection strength to be a particular total metric, or the user may define attributes that are more or most important in calculating connection strength (e.g., the user may want geographic proximity or educational background to play more important roles for a certain target.)

When the alert was provided to the client system's introduction alert module, the client displays, plays, or otherwise provides the alert (438). In some embodiments, the alert is provided periodically until it is acknowledged by the user. For example, the alert is provided as a "pop-up" message until the user chooses to "snooze", "dismiss", or "save" the alert.

In FIG. 4B, the client 102 obtains information regarding the user's primary connections (402). In some embodiments, the information regarding the primary connections is obtained for email connections (406). Furthermore, in some embodiments, the information regarding the primary connections is obtained for social networking connections (408). Elements 402-408 are explained in more detail with respect to FIG. 4A. It is noted that many other sources such as phone systems, IM systems, location based networking systems, etc also used in some embodiments to obtain information regarding the user's primary connections (402). The connection information is then sent to the introduction alerts server system 106. (410).

The introduction alerts server system 106 receives the connection information (412) either as connections themselves, or as information (such as access credentials) form which the connections are then obtained, or a combination thereof. Using the user's primary connections, the introduction alerts server system 106 obtains secondary connections for the user and sends them to the client 102. It is noted, that the client in the process described in FIG. 4B, is a thick client, as illustrated in FIG. 3B. The client receives the secondary connections (415). In some embodiments, the secondary connections are received in the form of immediate influence graphs for the user's primary connections or the user's communities. The client then uses the primary and secondary connections to build the user's social sphere of influence (414). The details of building a social sphere of influence are described in more detail with respect to FIG. 7.

The client 102 (specifically, the PeopleQueue input module 324) receives one or more target indicators (416). In some embodiments, the user to manually inputs an indicator for a target, while in other embodiments the user selects a suggested target, as explained in more detail with respect to FIG. 4A.

The PeopleQueue application 110a then creates records for the targets a based on the indicators (426). It also stores them in the local PeopleQueue database 112a. In some embodiments, the records are stored in a PeopleQueue list as illustrated in FIG. 10. The PeopleQueue list includes records for targets based at least on the indicators. Each PeopleQueue record comprises at least the received indicator. In many embodiments, the PeopleQueue record includes an identification number for the target as well as a variety of additional information about the target as shown in FIG. 11. In some embodiments, the PeopleQueue application 110a queries the PeopleQueue systems 110 on the server to obtain additional information about the target as explained in detail with respect to FIG. 4A.

The client (specifically the introduction alert application 108a) compares a respective target record of the PeopleQueue list with a plurality of records in the user's social sphere of influence (428). In some embodiments, it determines if a target record matches one of the secondary connections of the user. In some embodiments, it determines if the target record matches a primary connection of the user. In yet other embodiments, it determines if the target record matches a primary or a secondary connection of the user.

When one or more alert conditions are met, the introduction alert system (specifically the introduction alert service system 108) provides an alert (430). The alert is an introduction alert, i.e., it provides an alert that a personal connection exists between the user and the target. In some embodiments, an alert is provided when a target record matches at least one of the secondary connections of the user. In other embodiments, an alert is provided when a first match condition is met. In some embodiments, the first match condition is that a target record of the PeopleQueue list matches at least one record in the user's social sphere of influence (primary or secondary connections). The alert can be a new person alert, a new connection alert, or a stronger connection alert as explained in detail with respect to FIG. 4A. In some embodiments, the alert is provided to the client system's introduction alert module 332 for audio alert, physical alert, and/or visual display of the alert. In other embodiments, the alert is provided to an external system such as a push notification to a mobile device, an IM, an email, or even an automated voicemail.

When the alert was provided to the client system's introduction alert module, the client displays, plays, or otherwise provides the alert (438). In some embodiments, the alert is provided periodically until it is acknowledged by the user. For example, the alert is provided as a "pop-up" message until the user chooses to "snooze", "dismiss", or "save" the alert.

Figure 5:
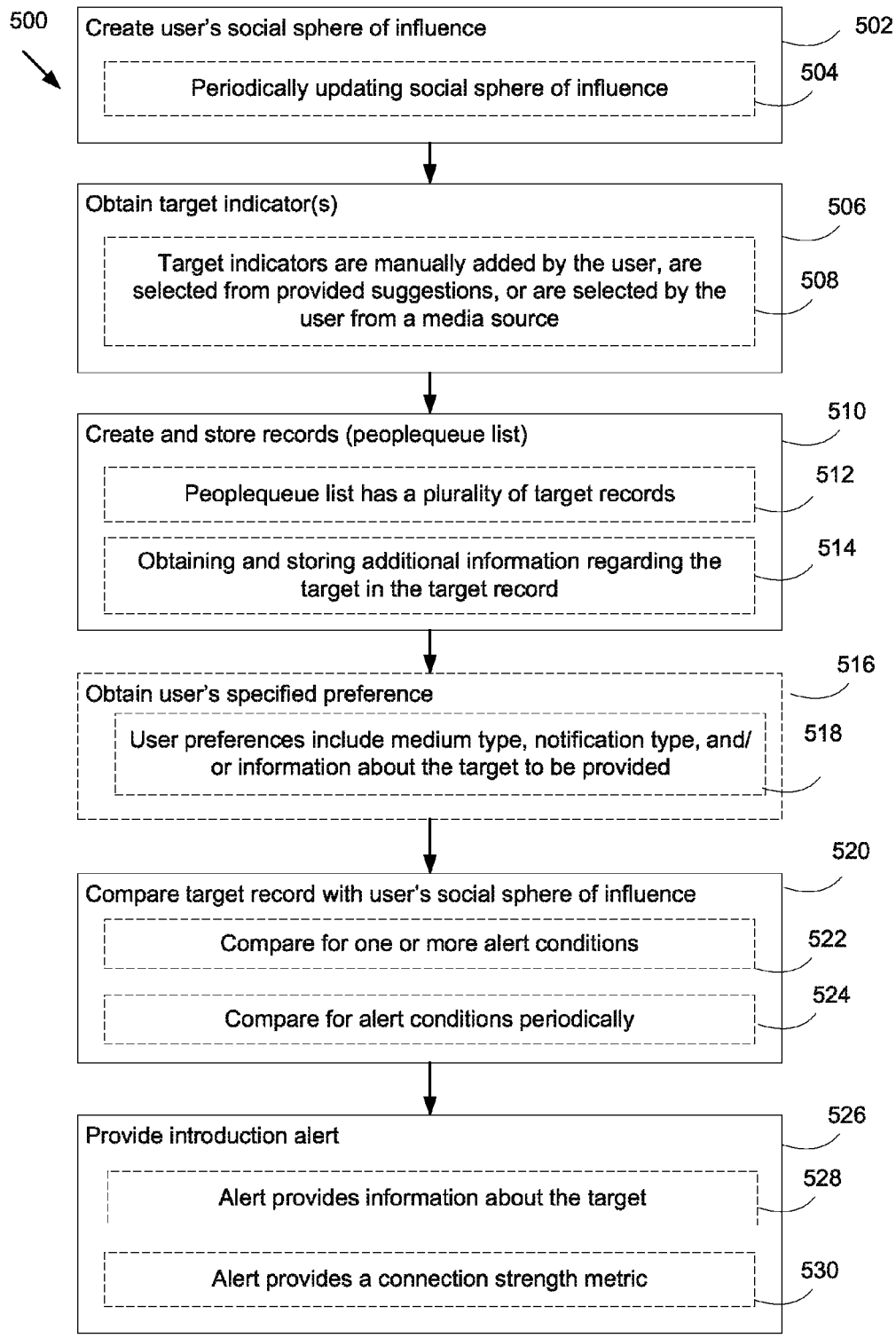
FIG. 5 is a flowchart illustrating a method of providing an introduction alert, in accordance with some embodiments.

FIG. 5 is a flowchart illustrating a method of providing an introduction alert 500, in accordance with some embodiments. The method described below includes functions that can be performed by either components of the introduction alerts server system 106 or by the client 102 as discussed with respect to FIGS. 4A and 4B.

A social sphere of influence is created (502). The user's social sphere of influence includes the user's primary and secondary connections. The details of building a social sphere of influence are described in more detail with respect to FIG. 7. The social sphere of influence is periodically updated (504). In other words, the user's primary and secondary connections are updated. For example, in some embodiments, the social sphere of influence is updated daily. In other embodiments, the social sphere of influence is updated in response to user activity. For example, in some implementations it is updated when a new indicator for a target is received. In some embodiments, the user provides a specified period for updating the social sphere of influence, and this user specified update period is stored in the user database 118 or 118a. Then the social sphere of influence is periodically updated in accordance with the user specified period.

Either before or after the social sphere of influence is created (or updated), one or more target indicators are obtained (506). A target is person the user desires to meet. A target indicator can be one or more of a name, an image, a title, a company or organization association, a skill (e.g. UX expert), and interest, etc. In some embodiments, target indicators are manually added by the user, are selected from provided suggestions, or are selected from a media source (508). Obtaining the target indicators includes the client receiving target indicators from the user, and in some embodiments providing the target indicators to the introduction alerts sever system, either as a push or as a pull data transfer. In other words, in some implementations the introduction alerts server system requests the target indicators, and the client system then provides them. While in other embodiments, the client system initiates the process of providing the target indicators to the introduction alerts server system. More details regarding the receipt of target indicators is described with respect to FIG. 4A.

Based on the target indicators, record(s) for the target(s) are then created (510). The records, sometimes called target records, are stored either on a local PeopleQueue database 112a or on server PeopleQueue database 112 along with similar target records for other users depending on the embodiment. In some embodiments, the target records for the user are stored in a PeopleQueue list as illustrated in FIG. 10. A PeopleQueue list has a plurality of target records for the user (512). Each target record comprises at least the received indicator. In some embodiments, a target record includes the received target indicator, a timestamp, and an identification number for the target. In some embodiments, additional information and metadata regarding the target is obtained from an external source, and the additional information is recorded in the target record (514). This additional information for the target record is obtained from a variety of sources as discussed with respect to FIGS. 4A and 4B. An exemplary target record is as shown in FIG. 11.

Optionally a user specified preference is obtained (516). Obtaining the user specified preferences includes the client receiving the preferences from the user, and in some embodiments providing the user specified to the introduction alerts sever system, either as a push or as a pull data transfer. In other words, in some implementations the introduction alerts server system requests the user specified preferences, and the client system then provides them. While in other embodiments, the client system initiates the process of providing the user specified preferences to the introduction alerts server system. In some embodiments the user specified preference includes an alert preference. In some embodiments, the user specifies preferences for all targets, which in other embodiments the user specified preference is for an individual target. In embodiments where the specified preference is for an individual target, the specification information is stored in the PeopleQueue target record, as shown in FIG. 11. In some embodiments, the user specifies preferences for all targets, the specification information is stored in the PeopleQueue list or in the PeopleQueue target records (of the PeopleQueue database 112 or 112a), or in the user database (118 or 118a).

Optionally, the user specifies alert preferences including one or more of: a medium type, a notification type, and information about the target to be provided (518). In some embodiments, the user specifies a notification type for one or more alerts. Notification types include but are not limited to push notification to a mobile device, an IM, an email, an automated voicemail, or a notification to the client system's introduction alert module. In some embodiments, the user specifies a medium type for one or more alerts. Medium types include but are not limited to audio alerts, physical alert (e.g., a vibration), and/or visual display of the alert.

In some embodiments, the user specifies what information about the target is to be provided in the alert (if available). User specified information about the target includes but are not limited to the target's: name, title, skills, specialties, company, school(s), groups, industry association, location, honors, and interests. In some embodiments, when a user has provided a non-name target indicator, information regarding that category will be automatically included as part of the information provided in the alert. For example, when a skill is provided for the target indicator, the target's skills will be provided in the alert. This can be helpful for example even if the user wants to use the introduction alerts service to tell him who is in his social sphere of influence having a particular skill (even when the user wants to know for example, who in his company is skilled in a particular area or knowledgeable on a particular topic.) In some embodiments, user specified information about the target also includes but is not limited to: names of shared primary connection(s), a connection strength indication for a shared primary connection, common threads with the primary connection, and a link to an external profile, such as a public profile on a social networking website.

In some embodiments the user specified preferences include a connection strength preference/threshold. For example, in some embodiments, the user specifies that an alert should not be sent until the connection strength is above a threshold (e.g. 50% strength). In some embodiments, the user specifies a strength preference specifically for strength connection alert condition. In some embodiments, the strength preference is not used when matching for a new connection match condition or a new person match condition. In other embodiments the strength preference is used when matching any alert condition.

In some embodiments, the user specified preferences include a specified period for periodically comparing target record(s) with the user's social sphere of influence. In some embodiments, the user specifies preferences for all targets, while in other embodiments the user specified period is for an individual target. In some embodiments, the specified period is fixed, such as once an hour, twice a day, once a day, once a week, once every two weeks, or once a month. In other embodiments, the specified period is tied to a triggering condition such every time the social sphere of influence is updated, every time a new primary connection is added, every time a new target indicator is provided, every time the user joins a new organization, or every time the user logs into a program associated with the introduction alert system.

A respective target record of the PeopleQueue list is then compared with a plurality of records in the user's social sphere of influence (520). The comparison is performed either by the social sphere of influence system 114 or the social sphere of influence application 114a as described with respect to FIGS. 4A and 4B. In some embodiments, the respective target recorded is compared with at least the user's secondary connections. In some embodiments, the respective target record is compared with the primary connections of the user. For example, when a user has specified a title or geographic location, but not a name for the target indicator, the target may exist in the user's primary connections without the user being aware of it. In yet other embodiments, the respective target record is compared to both primary and a secondary connections of the user. The comparison is performed in order to determine if one or more alert conditions are met (522). The alert conditions include but are not limited to: a first match condition (matching primary and/or secondary connections), a new connection match condition, a new person match condition, and strength condition. The process of matching various alert conditions is explained in more detail with respect to FIG. 6.

In some embodiments, the comparison is performed periodically (524). In some embodiments, the periodic comparison is performed for all records in the user's PeopleQueue list, while in other embodiments the comparison period is distinct of a respective target record. The periodic comparison is performed at least once in each comparison period. In some embodiments, the comparison period is fixed, such as once an hour, twice a day, once a day, once a week, once every two weeks, or once a month. In other embodiments, the comparison period is tied to a triggering condition such every time the social sphere of influence is updated, every time a new primary connection is added, every time a new target indicator is provided, every time the user joins a new organization, or every time the user logs into a program associated with the introduction alert system. In some embodiments the comparison is performed (for one or more, or all of the target records) in accordance with one or more user specified comparison periods, either fixed or tied to a triggering condition as explained with respect to (516), the user's specified preference(s).

An alert is provided (526). In some embodiments, an alert is provided when a target record matches at least one of the secondary connections of the user. In some embodiments, the alert is provided when one or more alert conditions are met. The alert conditions include but are not limited to: a first match condition (matching primary and/or secondary connections), a new connection match condition, a new person match condition, and strength condition. The process of matching various alert conditions is explained in more detail with respect to FIG. 6. In some embodiments, the alert includes information regarding whether it is a new person match, a new connection match, or a stronger connection match. In some embodiments, the alert is configured to be presented as an audio alert, physical alert, and/or visual display of the alert. In other embodiments, the alert is provided to an external system such as a push notification to a mobile device, an IM, an email, or even an automated voicemail.

In some embodiments, the alert provides information about the target (528). The information about the target includes but is not limited to the target's: name, title, skills, specialties, company, school(s), groups, industry association, location, honors, and interests. In some embodiments, information regarding, company, school(s), groups, industry association, or interests are provided initially only when they are shared with the user. In some embodiments, some of this information is provided upon request by the user, e.g., if the user selects a link associated with the target, the user will be provided with more information. In some embodiments, information provided about the target also includes but is not limited to: names of shared primary connection(s), a connection strength indication for a shared primary connection, and common threads with the primary connection. In some embodiments, the above mentioned information regarding the target such as name title, etc. is also provided or provided in response to a user request (e.g., via link selection) for the shared primary connection(s) as well as for the target. In some embodiments, the information about the target also includes a link to an external profile, such as a public profile on a social networking website.

In some embodiments, the alert also provides a connection strength metric (530). The connection strength metric is a measure of the quality of a connection between two people. In some embodiments, the connection strength metric is for the connection between a user and the target. In other embodiments, the connection strength metric is for the connection between a user's primary connection and the target. The connection strength metric can be visually presented in a variety of ways including but not limited to: a percentage, a score, and/or a filled bar indicating percentage or score. In other embodiments, the connection strength metric is presented as a number of stars (out of a total, e.g., 4 out of 5), a thumbs indication (two thumbs up, or a thumbs down), or similar quality icons. In some embodiments, the connection strength metric is a color indication (e.g. stronger connections are indicated in green and average connections are indicated in yellow, and weak connections are indicated in red. In some embodiments, color indications are included in addition to the above mentioned connection strength presentations of percentage, score, bar, stars, or thumbs. Examples of alerts and their associated information and strength metrics are illustrated in FIGS. 14-16.

Figure 6:
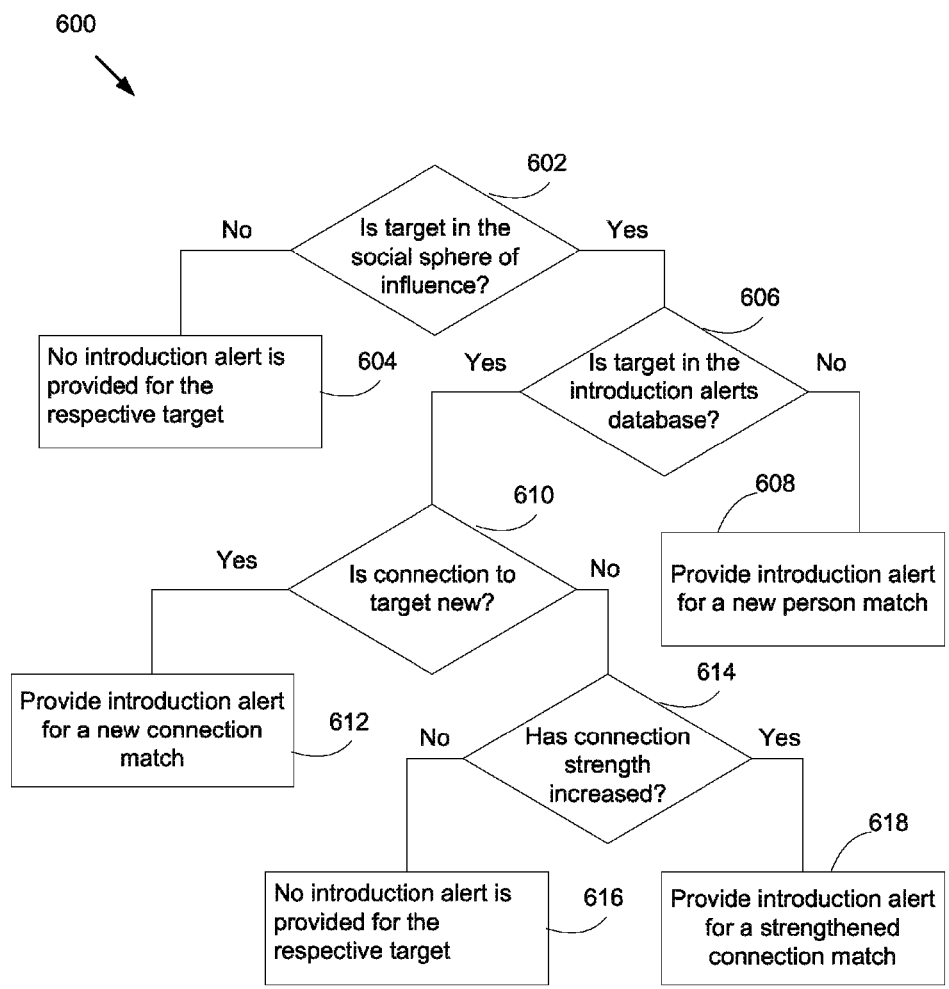
FIG. 6 is a flowchart illustrating a method of providing an introduction alert by checking for a plurality of alert conditions, in accordance with some embodiments.

FIG. 6 is a flowchart illustrating a method (600) of providing an introduction alert by checking for a plurality of alert conditions, in accordance with some embodiments. As such it illustrates how social sphere of influence is searched for a target record in the user's PeopleQueue list. Essentially, the steps performed in FIG. 6 illustrate the concept of comparing a respective target record of the PeopleQueue list with a plurality of records in the user's social sphere of influence described above in FIGS. 4A, 4B, and 5. The method is performed by either the introduction alert system 106 or the client 102 depending on the embodiment.

A determination is made as to whether a target is in the user's social sphere of influence (602). If the target is not in the user's social sphere of influence (No), then no introduction alert is provided for that target (604). The process then repeats for another target in the user's PeopleQueue list. If the target is in the user's social sphere of influence (Yes), then the process continues. A determination is made as to whether the target is in the introduction alerts database (124 or 124*a*), in other words the introduction alerts database is checked to see if an alert was previously provided regarding the target (606). If the target is not in the introduction alerts database (No), then an introduction alert for a new person match is provided (608). If the target is in the introduction alerts database (Yes), then the match is not a new person match. As such, a determination is made as to whether the connection to the target is new (610). In other words, a comparison is performed between the previous connection and the current connection. If both connections include the same people, e.g., the previous connection and the current connection are both between primary connection "John Smith", then the connection is not new. It is noted that if more than one connection existed in the introduction alerts database, the comparison is performed for each previous connection. When the connection is new (Yes), for example if the previous connection was with "John Smith" but the new connection is directly to the user, then an introduction alert is for a new connection match is provided (612). As explained above, in some embodiments any new connection match is provided, while in other embodiments only new connections which are stronger than the original connection are provided. If it is determined that the connection to the target is not new (No), then the process continues. A determination is made as to whether the connection strength of the connection has increased (614). If the connection strength as not increased (No), then no introduction alert is provided for the target (616). In some embodiments, if the connection strength has increased then an introduction alert is for a strengthened connection match is provided (618). In some embodiments, the strengthened connection match is provided only when the connection strength meets a connection strength threshold. In some embodiments the connection strength threshold is user specified, while in other embodiments it is set by the system. Examples of connection strength thresholds are set thresholds, such as a particular score or percentage (e.g., 50%) or a comparative threshold such as an increase of connection strength compared to the previous connection (e.g., an increase of at least 10%).

Figure 7:
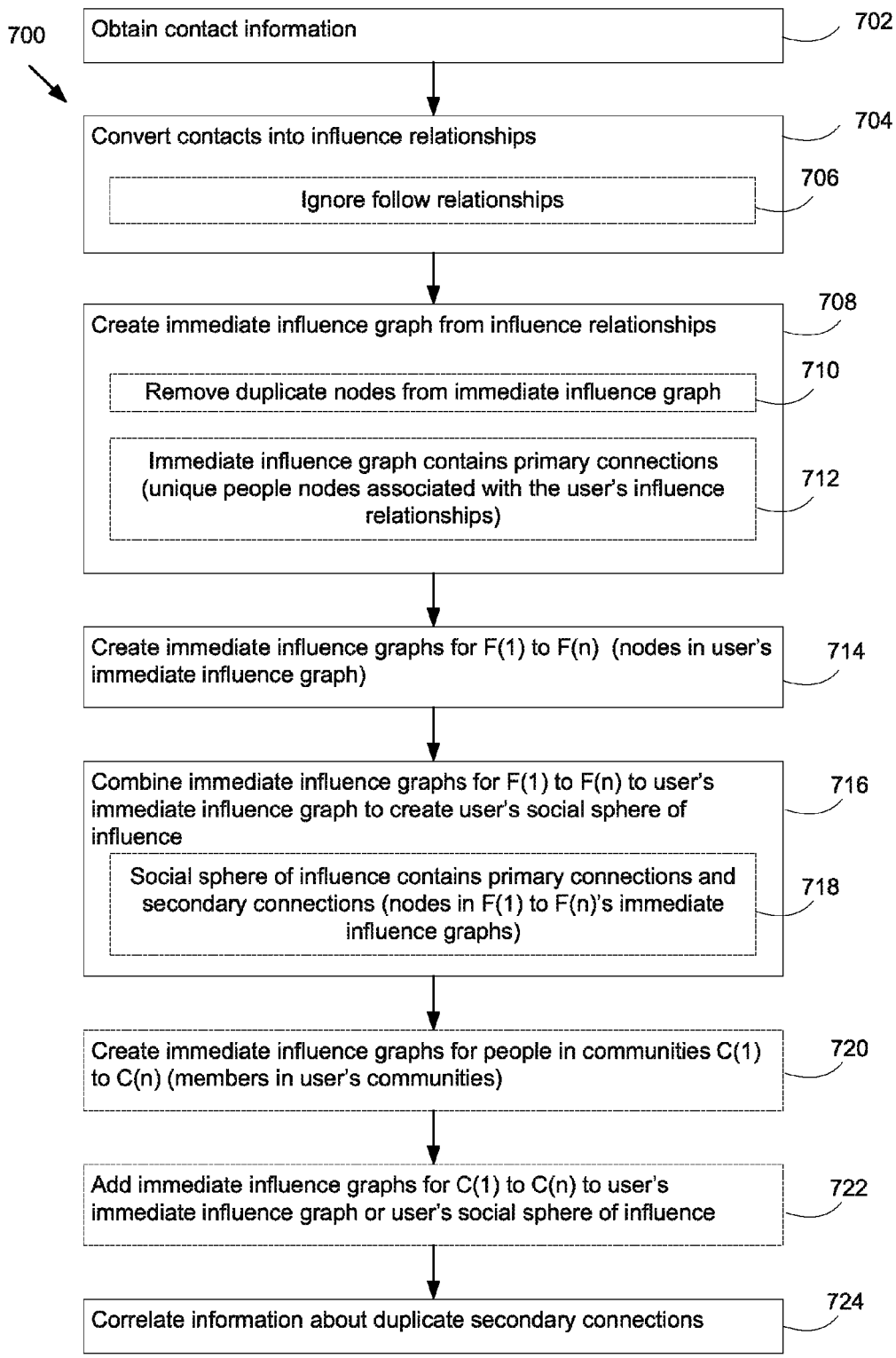
FIG. 7 is a flowchart illustrating a method of creating a user's immediate influence graph, in accordance with some embodiments.

FIG. 7 is a flowchart illustrating a method of creating a user's immediate influence graph, in accordance with some embodiments. A user's contacts are obtained (702). Contacts are direct connections to the user on various online and mobile services. They can be verified with an external source or program separate from the introduction alerts system. In some embodiments, the information regarding the contacts is obtained for email connections. As such, in some embodiments, the contacts are obtained by the client from one or more email services. In other embodiments, and the client provides the server access credentials to their email service(s) and the server obtains the contacts from the email service(s). In some embodiments, the information regarding the contacts is obtained for social networking connections. As such, in some embodiments, the contacts are obtained by the client from one or more social networking services. In other embodiments, and the client provides the server access with credentials to their social network and the server obtains the contacts from the various social networks. For exemplary purposes, email and social networking systems are sources for obtaining information regarding contacts which are described above, but it is noted that many other sources such as phone systems, IM systems, location based networking systems, etc also used in some embodiments to obtain information regarding the user's contacts.

Contacts are converted into influence relationships (704). Influence relationships have bidirectional communication or connections. For example, a person with which the user has two way communications via, email, IM, phone, social media, or other communications has an influence relationship with the user. Furthermore, a person deemed a friend or contact via a social networking service. Unidirectional or "follow" relationships alone are ignored (706).

Figure 8:
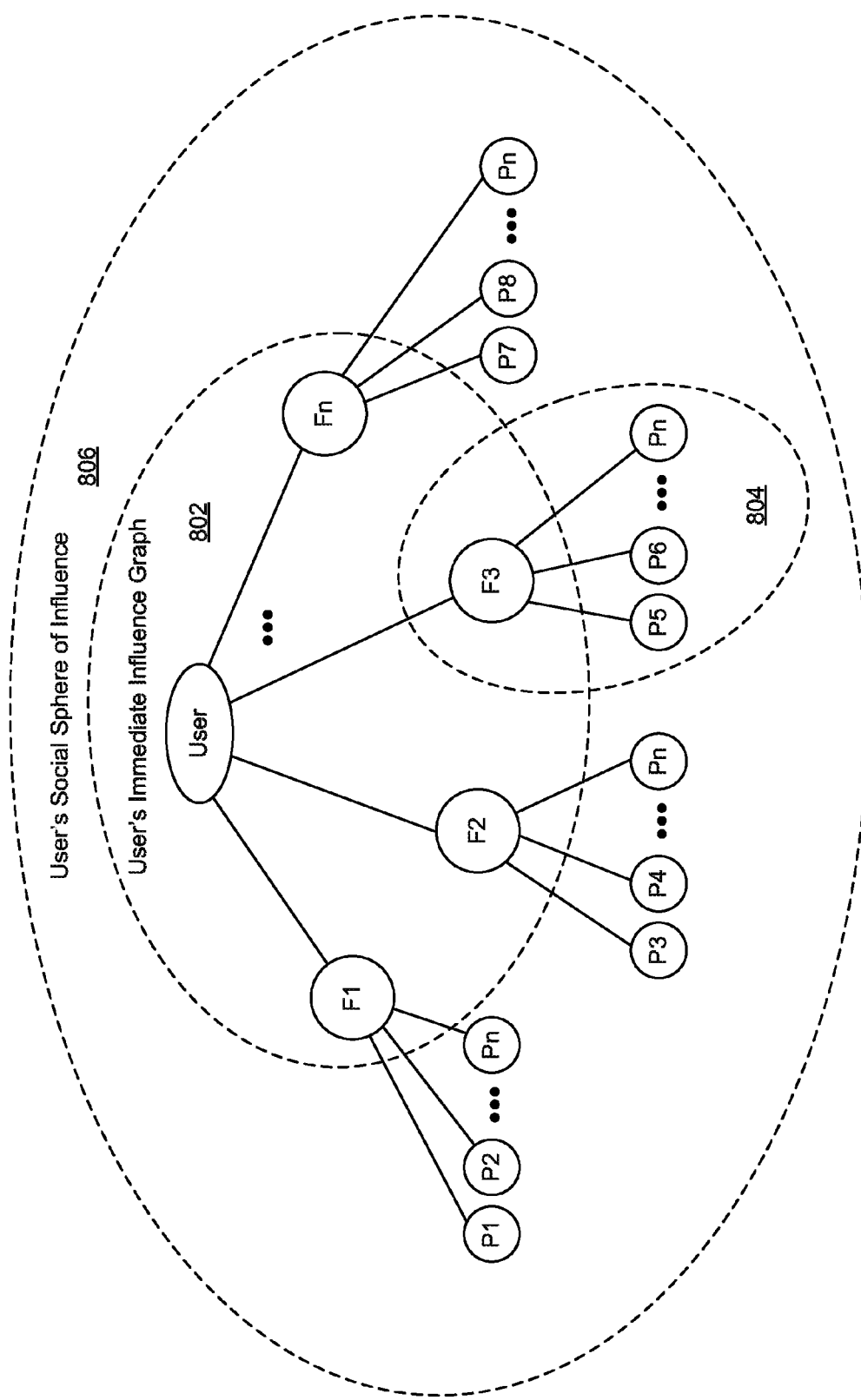
FIG. 8 illustrates an exemplary immediate influence graph and social sphere of influence for the user, in accordance with some embodiments.

An immediate influence graph is then created from the influence relationships (708). An example of an immediate influence graph for a user is illustrated in FIG. 8. Duplicate nodes of the immediate influence graph are removed (710). In some embodiments, duplicate nodes are removed by comparing personal details such as name, location, company name, work history, education history, e-mail addresses, phone numbers etc. For example, if a user may communicate with a friend via both email and text messages but one node on the immediate influence graph should represent that friend. As such, the user's immediate influence graph contains primary connections, which are unique people nodes associated with the user's influence relationships (712).

Then similar processes are performed in order to create an immediate influence graphs for a plurality of the user's primary connections (714). For a respective primary connection's contacts are obtained from an external source, in a manner similar to that described with respect to (702). The primary connection's contacts are converted in to influence relationships in a manner similar to that described with respect to (704). Then the primary connection's immediate influence graph is created from the influence relationships in a manner similar to that described with respect to (708), including the removal of duplicate nodes. The same process is performed for all or many of the user's primary connections.

The immediate influence graphs for the user's primary connections are then combined with the user's own immediate influence graph to create the user's social sphere of influence (716). An example of a user's social sphere of influence is illustrated in FIG. 8. The user's social sphere of influence includes primary connections and secondary connections (718). The secondary connections were obtained, as described above, from the contacts of various primary connection's contacts. A respective secondary connection includes a link between the respective primary connection and a respective contact of the plurality of primary connection's contacts.

Optionally, immediate influence graphs are also produced for members of the user's communities (720). Furthermore, optionally immediate influence graphs for the members of the user's communities are then combined with the user's own immediate influence graph or the user's current social sphere of influence to create or update the user's social sphere of influence (722).

The immediate influence graphs of the community members and/or the user's primary connections may contain duplicate nodes, in other words, there may be numerous duplicate secondary connections. As such, information regarding the user's duplicate secondary connections is correlated and duplicate nodes are removed (724). It is also noted, that if a connection appears both as a user's primary connection and as a user's secondary connection, the secondary connection is removed.

FIG. 8 illustrates an exemplary immediate influence graph and social sphere of influence, in accordance with some embodiments. The user's immediate influence graph 802 contains the user and primary connections F1-Fn. Each primary connection then has an immediate influence graph as well. F3's immediate influence graph is labeled as 804. The user's social sphere of influence 806 is made up of a combination of the user's immediate influence graph and at least some of the immediate influence graphs of the user's primary connections. As such, the user's social sphere of influence includes the user's primary connections and secondary connections. As is illustrated in FIG. 8, a user's secondary connection is a primary connection of the user's primary connection (e.g., the user's friend's friend.)

FIG. 9 illustrates an exemplary social sphere of influence for a user, in accordance with some embodiments. The user is associated with Communities C1, C2, and Cn. Community C1 has members C1M1, C1M2, and C1Mn in addition to the user. Community C2 has members C2M1-C2Mn in addition to the user. Community Cn also has members CnM1-Cn Mn in addition to the user. Member "n" of Community "C1", labeled MnC1, has an immediate influence graph is labeled as 902. In some embodiments, the user's social sphere of influence includes members of the user's communities. In some embodiments the community members are considered the user's secondary connections. In other embodiments, the user's social sphere of influence includes primary connections for each member of the user's communities. For example, in some communities, a pre-condition to joining the community is that members agree to shire their primary connections with other community members in return for gaining access to the other community members primary connections as well. In this embodiment the community members are considered the user's primary connections and the community member's primary connections are the user's secondary connections. This second embodiment is illustrated in FIG. 9, where the user's social sphere of influence is labeled 904.

FIG. 10 illustrates an exemplary PeopleQueue list 1000, according to some embodiments. The PeopleQueue list comprises a plurality of target records a plurality of users. For example, User 1 has Record for Target 1-Record for Target N, and User 2 has Record for Target-Record for Target N. FIG. 10 illustrates the type of PeopleQueue List stored in PeopleQueue database 112, on the introduction alert server system. PeopleQueue database 112a would only include one user's information, rather than lists for a plurality of users. For example, it would only include the target records for User 1 (Target 1-Record for Target N). In some embodiments, the target records in the PeopleQueue list are associated with information regarding the indicator/input received from the user regarding the target. As illustrated in FIG. 10 the received indicator may be a name (e.g., name 1, name 2, etc), but can also be a title (e.g., title 3), image (e.g., image 5), skill (e.g., skill 9), or other inputs such as those as described with respect to FIGS. 4A and 4B. In some embodiments, the includes PeopleQueue list 1000 comprises records or links to records for each target (e.g., "Record for Target 1") The target records contain a variety of additional information regarding the target as illustrated in FIG. 11.

FIG. 11 illustrates an exemplary target record 1100, according to some embodiments. The target record includes an ID for the target 1102, such as an identification number. In most embodiments, the target record also includes the date and optionally the time that the target record was added to the PeopleQueue list 1104, or alternatively the date and optionally the time that the target indicator was obtained.

When available, personal information regarding the target 1101 is also included in the target record. When available, the target's name 1106 or names, pseudonyms, and alternate name spellings are included. In some embodiments, the target's current and/or past company name(s) 1108 are included in the target record. Similarly, the target's current and/or past title(s) 1110 are also optionally included in the target record. Additional information 1112 is also stored in the target record when available, additional information includes but is not limited to the target's current or past skills, industry, location, marital status, interests, associations, honors, and a textual summary or CV associated with the target.

The target record optionally includes information regarding the introduction alerts comparison process 1103. For example it may include a current status 1114, such as not in the user's social sphere of influence at the time of the last comparison. If the user was in the social sphere of influence the information would be for example that a new person alert provided on a particular date and time (e.g., Jun. 8, 2012, 8:15 am) and a new connection alert provided on a later date and time (e.g., Sep. 1, 2012, 1:30 pm). In some embodiments, the target record also includes a last checked status 1116.

The target record optionally includes system or user specified alert preferences 1105. In some embodiments, the target record includes a specified notify medium 1118. It may also include frequency information 1120, which includes the frequency with which an alert should be presented until the user acknowledges the alert, and may also include a specification regarding how often the target record should be compared to the user's social sphere of influence. In some embodiments, a connection strength threshold 1122 is also provided. The connection strength threshold specifies either a set threshold such as a particular score or percentage (e.g., 50%) or a comparative threshold such as an increase of connection strength compared to the previous connection (e.g., an increase of at least 10%). In most embodiments, the connection strength threshold is used at least when providing a stronger connection alert. The connection strength threshold optionally specifies if the threshold should be used before providing a new person alert or a new connection alert, and is used what that threshold should be in each instance.

FIG. 12 illustrates an exemplary introduction alerts record 1200, according to some embodiments. The introduction alerts record includes an ID for the alert 1202. In some embodiments, each alert is recorded separately in the introduction alerts database 112 or 112a, each having their own alert ID 1202. In other embodiments, all alerts regarding a particular target are stored as one alert record under the same alert ID 1202. The introduction alerts record also includes the ID for the target 1102, as described with respect to FIG. 11. In most embodiments, the target record also includes the date that the alert was provided 1204. Also, in most embodiments, the target record also includes the time that the alert was provided 1206. If the alert was provided on multiple occasions before the user acknowledged the alert, the date and optionally the time of each provision may be recorded. Optionally, the notification medium of the alert 1208 is also stored in the introduction alerts record. When the user is connected to the target through a primary connection, the identification of that primary connection 1210 is also recorded. Furthermore, information regarding the strength of the connection between the user and the target as the connection strength 1212 is stored. The connection strength 1212 includes information about the connection strength between the user and the target or between the user's primary connection and the target depending on the match. In some embodiments, a connection strength threshold 1122 is also provided. The connection strength threshold specifies either a set threshold or a comparative threshold, and specifies which type of alerts it should apply to (stronger connection alert, new person alert, and/or a new connection alert) as described with respect to FIG. 11. Similarly, sometimes additional information 1112 regarding the target, as explained with respect to FIG. 11, is also stored in the introduction alerts record. In some embodiments, feedback information 1214 is stored in the introduction alerts record. For example, the feedback information may include information regarding whether an introduction between the user and the target was initiated, and optionally by what medium(s) the introduction occurred. It is noted, that in some embodiments the feedback information may includes whether the user requested an introduction and also whether the introduction occurred (verified by checking communications within programs associated with the introduction alerts system or by checking communications over services external to it.) It is noted that this feedback information may also include a success measure. For example, if the introduction was successful, if the target becomes a primary connection of the user after an introduction is made, then the introduction would be deemed successful. Furthermore, the successful introduction will, in some embodiments, affect a success score associated with the person who made the introduction. For example, if primary connection 1 made the introduction, then primary connection 1 will have an increased feedback score, which is stored in a record associated with primary connection 1, as shown in FIG. 13A.

Figure 13A:
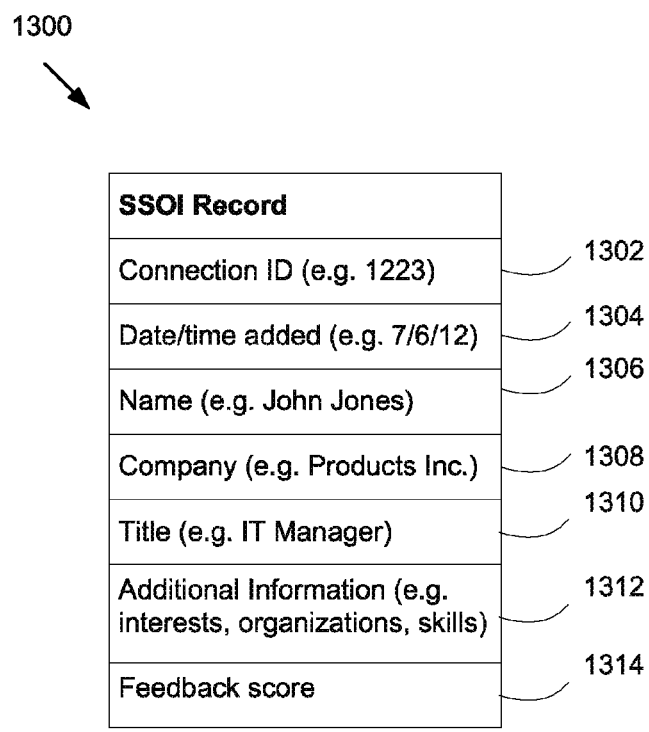

FIG. 13A illustrates an exemplary social sphere of influence record 1300, according to some embodiments. The social sphere of influence record includes an ID for the connection 1302, such as an identification number. The connection can be a user's primary connection or a user's secondary connection. In most embodiments, the social sphere of influence record also includes the date and optionally the time that the social sphere of influence record was added to the user's social sphere of influence. Personal information regarding the connection is also included in the social sphere of influence record. The connection's name 1306 or names, pseudonyms, and alternate name spellings are included. In some embodiments, the connection's current and/or past company name(s) 1308 are included in the social sphere of influence record. Similarly, the target's current and/or past title(s) 1310 are also optionally included in the social sphere of influence record. Additional information 1312 is also stored in the social sphere of influence record when available, additional information includes but is not limited to the connection's current or past skills, industry, location, marital status, interests, associations, honors, and a textual summary or CV associated with the connection. In some embodiments, the connection's feedback score 1314 is also included. The feedback score measures how successful the connection is at making introductions. For example, in some embodiments, the feedback score is a combination of how often the connection was asked to make an introduction, how often the connection made the introduction, and how successful the introduction was. In some embodiments, success of the introduction is provided by a user selected rating of success. In other embodiments it is calculated from external factors, such as how much communication occurred between a user and a target after the introduction and/or whether the target subsequently became a user's primary connection.

FIG. 13B illustrates an exemplary listing of connections in a user's social sphere of influence database 1350, according to some embodiments. The database list comprises a plurality of primary and secondary connection records for one or more users. For example, User 1 has Primary Connections which are Friend 1, Friend 2, Friend 3, through Friend N. User 1 has secondary connections associated with Friend 1, which are Person 1, Person 2, through Person N. User 1 has secondary connections associated with Friend 2, which are Person 3, Person 4, through Person N. It is noted that FIG. 13B illustrates the type of social sphere of influence list stored in social sphere of influence database 116a, on the client. However, the social sphere of influence database 116, on the introduction alerts server system would include similar information for a plurality of users (e.g., User 2's primary and secondary connections). In some embodiments, the connection records in the user's social sphere of influence database include a connection strength metric. As illustrated in FIG. 13A, a connection strength between the User (U) and a primary connection (F) for each primary connection (Friend 1-Friend N) is recorded. Also, a connection strength between a primary connection (F) and a secondary connection (P) for each secondary connection (Person 1-Person N) is also recorded. The connection strength metrics is a measure of the quality of a connection between two people. In some embodiments, the connection strength metric is for the connection between a user and the target. FIG. 13B illustrates connection strength metrics in percentages (%), but the connection strength metric can be stored in various ways such as a numerical score, a number of stars, a number of thumbs up or down, etc. In some embodiments, the connection strength includes an analysis one or more of: shared educational background, shared professional background, number of shared networks (e.g., connected to or communicating with each other via email, IM, social networking systems, phone, etc). In some embodiments, the user's social sphere of influence database comprises records or links to records for each connection (Friend 1), the social sphere of influence records contain a variety of additional information regarding the connection as illustrated in FIG. 13A.

FIG. 14 illustrates an exemplary client display of an alert 1400, according to some embodiments. The alert 1400 is displayed on the display 306 of a client 102, which may or may not be touch sensitive 309. The displayed alert 1400 provides information regarding a personal connection from a user to a target (an individual that the user desires to meet.) In most embodiments, the alert includes target information 1402, connection information 1406, and connection strength metrics 1404 between the target and the connection. The target information 1402 includes at least the name of the target 1408, and includes various other information about the target such as the target's title 1410 and company 1412, a link to further information about the target 1414, as well a picture of the target 1416 (when available). Similarly, the connection information 1406 includes at least the name of the connection 1418, and includes various other information about the connection such as the connection's title 1420 and company 1422, a link to further information about the connection 1424, as well a picture of the connection 1426 (when available). The connection strength metrics are displayed to visually indicate the connection strength metric between the target and the connection. The connection strength metric displayed in FIG. 14 is presented as both a filled bar 1428 and as a numerical percentage score 1430. In other embodiments, the connection strength metric is presented as a number of stars (out of a total, e.g., 4 out of 5), a thumbs indication (two thumbs up, or a thumbs down), or similar quality icons, not shown in this figure but discussed with respect to FIG. 5. It is noted that when the target is a primary connection to the user then no connection information is provided, but instead under the connection information will say "me" or a similar self referencing indicator. The display of a connection strength metric is also optional when the target is a primary connection of the user.

FIG. 15 illustrates an exemplary client display of an alert 1500, according to some embodiments. The alert 1500 is displayed on the display 306 of a client 102, which may or may not be touch sensitive 309. The displayed alert 1500 provides information regarding a personal connection from a user to a target via through primary connections. One advantage of displaying several connections simultaneously is that the user can easily compare connections and connection strengths associated with them. In most embodiments, the alert includes target information 1402, connection information 1406, and connection strength metrics 1404. It may also contain common threads 1502. The target information 1402 can include any elements discussed with respect to FIG. 14, for the sake of space, FIG. 15 illustrates only the target's picture 1416 and a link 1414 to more information about the target. Similarly, information regarding the connections 1406 can include any element discussed with respect to FIG. 14, but for the sake of space, FIG. 15 illustrates only the connection's name, where the name is also a selectable link to more information about the connection. The connections 1504, 1506, 1508, and 1510 are listed in order of connection strength, as measured by the connection strength metric. In FIG. 15, for the sake of space, only the filled bar indicating connection strength is illustrated. It is noted that in some embodiments, the connection strength metric is also indicated by color or design. For example, in FIG. 15, the connection strength under 50% has a less shaded bar than connection strengths over 50%. FIG. 15 also illustrates an introduction button 1512 associated with each connection (e.g., "get introduced"). The user can kick off an introduction process with a particular connection by selecting the introduction button associated with that connection. Specifically, when the user selects this button a request is sent to the connection to introduce the user to the target. FIG. 15 also provides information regarding one or more common threads 1502 between the target and a connection. Common threads can exist in business or social networking sights, electronic mail, bulletin boards, and other forms of electronic communication. In some embodiments, when a thread icon 1514 is selected, the transcript for one or more threads between the contact and the user are displayed. For the sake of personal privacy, in some embodiments, the thread transcripts displayed are only those which are made public by the target and the connection. However, if the user himself was recipient of the thread or was given access, for example through a friend network, then a non-public transcript is available to the user in some embodiments.

FIG. 16 illustrates an exemplary client display of detailed information regarding the target associated with an alert 1600, according to some embodiments. It is displayed on the display 306 of a client 102, which may or may not be touch sensitive 309. In this embodiment, some information regarding the alert is displayed. This includes target information 1402, connection information 1406 for a specific connection (here the connection with the highest connection strength (FIG. 15, 1504) is illustrated), connection strength metrics 1404, an introduction button 1512, and common threads 1502 (including one or more thread icons 1514). The detailed information also includes a display additional information 1602 regarding the target, including the exemplary categories displayed in FIG. 16 of title 1604, company 1606, industry 1608, specialties 1610, interests 1612, location 1614, associations 1616, honors 1618, and a textual summary 1622 or CV associated with the target, and a link to an external profile 1620, such as a public profile on a social networking website. It is noted that different embodiments will provide different information depending on factors such as the information available in a target's profile, display space constraints of the client device, and any client preferences regarding the information to display.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method comprising:
   receiving one or more search criteria;
   in response to receiving the one or more search criteria, performing a first search of a sphere of influence of a particular user, wherein the first search comprises determining whether the one or more search criteria match any profile in a plurality of profiles of users that are within the sphere of influence of the particular user, wherein the sphere of influence of the particular user includes multiple users who have established friend relationships (a) with the particular user through one or more social network providers or (b) with other users who have established friend relationships through the one or more social network providers with the particular user;
   determining that the one or more search criteria do not match any profile of the plurality of profiles;
   after determining that the one or more search criteria do not match any profile of the plurality of profiles, updating the sphere of influence of the particular user to include a first profile of a first user that has established a friend relationship with a second user through one of the one or more social network providers but not with the particular user, wherein the second user is connected to the particular user, through one of the one or more social network providers, through zero or more other users;

after updating the sphere of influence of the particular user to include the first profile of the first user, automatically performing a second search of the sphere of influence of the particular user, wherein performing the second search comprises determining whether the one or more search criteria matches one or more profiles of users that are within the sphere of influence of the particular user, wherein automatically performing the second search is performed after waiting a particular amount of time after performing the first search;

determining that the one or more search criteria matches the first profile;

in response to determining that the one or more search criteria matches the first profile:
storing data that associates the particular user with the first profile,
causing an alert to be presented to the particular user, wherein the alert includes information about how the first user is connected to the particular user, wherein the first user is connected, in one of the one or more social network providers, to the particular user through the second user;

wherein the method is performed by one or more computing devices.

2. The method of claim 1, wherein the one or more search criteria includes one or more of a name, a title, a company, an organization, a skill, or an interest.

3. The method of claim 1, wherein the one or more profiles are in the plurality of profiles while the first search is performed, the method further comprising, after determining that the one or more search criteria do not match any profile of the plurality of profiles and prior to automatically performing the second search:
updating the one or more profiles with additional information that matches the one or more search criteria.

4. The method of claim 1, further comprising, after determining that the one or more search criteria do not match any profile of the plurality of profiles and prior to automatically performing the second search:
updating the sphere of influence of the particular user to include the one or more profiles.

5. The method of claim 1, wherein:
the sphere of influence includes primary connections of the particular user and secondary connections of the particular user;
each of the secondary connections of the particular user is a connection that is connected to the particular user, in the sphere of influence, only through one or more other users.

6. The method of claim 1, wherein the sphere of influence includes primary connections of the particular user, the method further comprising, prior to receiving the one or more search criteria:
for each primary connection of the primary connections, adding said each primary connection to the sphere of influence of the particular user based on input received from the particular user.

7. The method of claim 1, further comprising, prior to receiving the one or more search criteria:
sending, to a third-party service, a request for connection data of the particular user;
after sending the request, receiving, from the third-party service, first connection data that includes information about a plurality of connections of the particular user;
updating the sphere of influence of the particular user based on the first connection data.

8. The method of claim 7, wherein each connection of the plurality of connections corresponds to a user that has established a relationship with the particular user through the third-party service.

9. The method of claim 7, wherein the third-party service is an email service, an instant messaging service, or a social networking service.

10. The method of claim 7, further comprising:
sending, to a second third-party service that is different than said third-party service, a second request for connection data of the particular user;
after sending the request, receiving, from the second third-party service, second connection data that includes information about a second plurality of connections of the particular user;
updating the sphere of influence of the particular user based on the second connection data.

11. The method of claim 1, wherein automatically performing the second search is performed in response to receiving input that does not include the one or more search criteria.

12. One or more non-transitory computer-readable media storing instructions which, when executed by one or more processors, cause:
receiving one or more search criteria;
in response to receiving the one or more search criteria, performing a first search of a sphere of influence of a particular user, wherein the first search comprises determining whether the one or more search criteria match any profile in a plurality of profiles of users that are within the sphere of influence of the particular user, wherein the sphere of influence of the particular user includes multiple users who have established friend relationships (a) with the particular user through one or more social network providers or (b) with other users who have established friend relationships through the one or more social network providers with the particular user;
determining that the one or more search criteria do not match any profile of the plurality of profiles;
after determining that the one or more search criteria do not match any profile of the plurality of profiles, updating the sphere of influence of the particular user to include a first profile of a first user that has established a friend relationship with a second user through one of the one or more social network providers but not with the particular user, wherein the second user is connected to the particular user, through one of the one or more social network providers, through zero or more other users;
after updating the sphere of influence of the particular user to include the first profile of the first user, automatically performing a second search of the sphere of influence of the particular user, wherein performing the second search comprises determining whether the one or more search criteria matches one or more profiles of users that are within the sphere of influence of the particular user, wherein automatically performing the second search is performed after waiting a particular amount of time after performing the first search;
determining that the one or more search criteria matches the first profile;
in response to determining that the one or more search criteria matches the first profile:
storing data that associates the particular user with the first profile, causing an alert to be presented to the particular user, wherein the alert includes information about how the first user is connected to the particular user, wherein the first user is connected, in one of the one or more social network providers, to the particular user through the second user.

13. The one or more non-transitory computer-readable media of claim 12, wherein the one or more search criteria includes one or more of a name, a title, a company, an organization, a skill, or an interest.

14. The one or more non-transitory computer-readable media of claim 12, wherein the one or more profiles are in the plurality of profiles while the first search is performed, wherein the instructions, when executed by the one or more processors, further cause, after determining that the one or more search criteria do not match any profile of the plurality of profiles and prior to automatically performing the second search:
updating the one or more profiles with additional information that matches the one or more search criteria.

15. The one or more non-transitory computer-readable media of claim 12, wherein the instructions, when executed by the one or more processors, further cause, after determining that the one or more search criteria do not match any profile of the plurality of profiles and prior to automatically performing the second search:
updating the sphere of influence of the particular user to include the one or more profiles.

16. The one or more non-transitory computer-readable media of claim 12, wherein:
the sphere of influence includes primary connections of the particular user and secondary connections of the particular user;
each of the secondary connections of the particular user is a connection that is connected to the particular user, in the sphere of influence, only through one or more other users.

17. The one or more non-transitory computer-readable media of claim 12, wherein the sphere of influence includes primary connections of the particular user, wherein the instructions, when executed by the one or more processors, further cause, prior to receiving the one or more search criteria:
for each primary connection of the primary connections, adding said each primary connection to the sphere of influence of the particular user based on input received from the particular user.

18. The one or more non-transitory computer-readable media of claim 12, wherein the instructions, when executed by the one or more processors, further cause, prior to receiving the one or more search criteria:
sending, to a third-party service, a request for connection data of the particular user;
after sending the request, receiving, from the third-party service, first connection data that includes information about a plurality of connections of the particular user;
updating the sphere of influence of the particular user based on the first connection data.

19. The one or more non-transitory computer-readable media of claim 18, wherein each connection of the plurality of connections corresponds to a user that has established a relationship with the particular user through the third-party service.

20. The one or more non-transitory computer-readable media of claim 18, wherein the third-party service is an email service, an instant messaging service, or a social networking service.

21. The one or more non-transitory computer-readable media of claim 18, wherein the instructions, when executed by the one or more processors, further cause:
sending, to a second third-party service that is different than said third-party service, a second request for connection data of the particular user;
after sending the request, receiving, from the second third-party service, second connection data that includes information about a second plurality of connections of the particular user;
updating the sphere of influence of the particular user based on the second connection data.

22. The one or more non-transitory computer-readable media of claim 12, wherein automatically performing the second search is performed in response to receiving input that does not include the one or more search criteria.

* * * * *